US011490286B2

(12) United States Patent
Muniraju et al.

(10) Patent No.: US 11,490,286 B2
(45) Date of Patent: Nov. 1, 2022

(54) SYSTEMS AND METHODS FOR ROBUST MAX CONSENSUS FOR WIRELESS SENSOR NETWORKS

(71) Applicants: Gowtham Muniraju, Tempe, AZ (US); Cihan Tepedelenlioglu, Chandler, AZ (US); Andreas Spanias, Tempe, AZ (US)

(72) Inventors: Gowtham Muniraju, Tempe, AZ (US); Cihan Tepedelenlioglu, Chandler, AZ (US); Andreas Spanias, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 90 days.

(21) Appl. No.: 17/146,130

(22) Filed: Jan. 11, 2021

(65) Prior Publication Data

US 2021/0219167 A1    Jul. 15, 2021

Related U.S. Application Data

(60) Provisional application No. 62/959,564, filed on Jan. 10, 2020.

(51) Int. Cl.
*H04W 28/02* (2009.01)
*H04W 84/18* (2009.01)
*H04W 4/38* (2018.01)
*H04W 74/00* (2009.01)

(52) U.S. Cl.
CPC ......... *H04W 28/0247* (2013.01); *H04W 4/38* (2018.02); *H04W 28/0273* (2013.01); *H04W 74/002* (2013.01); *H04W 84/18* (2013.01)

(58) Field of Classification Search
CPC .............. H04W 28/0247; H04W 4/38; H04W 28/0273; H04W 74/002; H04W 84/18
See application file for complete search history.

(56) References Cited

U.S. PATENT DOCUMENTS

| 9,461,676 B2 | 10/2016 | Santucci et al. |
| 9,507,011 B2 | 11/2016 | Zhang et al. |
| 10,028,085 B2 | 7/2018 | Zhang et al. |
| 10,387,751 B2 | 8/2019 | Braun et al. |

(Continued)

FOREIGN PATENT DOCUMENTS

| CN | 101799541 A | 8/2010 |
| CN | 104038993 B | 8/2017 |

(Continued)

OTHER PUBLICATIONS

Muniraju et al. "Max Consensus in the Presence of Additive Noise" discloses "Robust Max Consensus Algorithm", Oct. 2018, IEEE.*

(Continued)

*Primary Examiner* — Jae Y Lee
(74) *Attorney, Agent, or Firm* — Polsinelli PC

(57) ABSTRACT

Various embodiments of systems and methods for robust max consensus for wireless sensor networks in the presence of additive noise by determining and removing a growth rate estimate from state values of each node in a wireless sensor network are disclosed.

20 Claims, 7 Drawing Sheets
(4 of 7 Drawing Sheet(s) Filed in Color)

(56) References Cited

U.S. PATENT DOCUMENTS

| | | |
|---|---|---|
| 10,440,553 B2 | 10/2019 | Zhang et al. |
| 2019/0384983 A1 | 12/2019 | Katoch et al. |
| 2020/0274484 A1 | 8/2020 | Narayanaswamy et al. |
| 2020/0358396 A1 | 11/2020 | Rao et al. |

FOREIGN PATENT DOCUMENTS

| | | |
|---|---|---|
| CN | 106100789 B | 2/2019 |
| CN | 109583488 A | 4/2019 |

OTHER PUBLICATIONS

Cover, et al., Elements of information theory. John Wiley & Sons, 2012.
David, et al., Order statistics, Encyclopedia of Statistical Sciences, vol. 9, 2004.
Heidergott, Max-plus linear stochastic systems and perturbation analysis. Springer Science & Business Media, 2006.
Auffinger, et al., 50 years of first passage percolation, arXiv preprint arXiv: 1511.03262, 2015.
Bauso, et al. Non-linear protocols for optimal distributed consensus in networks of dynamic agents, Systems & Control Letters, vol. 55, No. 11, pp. 918-928, 2006.
Cortes, Distributed algorithms for reaching consensus on general functions, Automatica, vol. 44, No. 3, pp. 726-737, 2008.
Farahani, et al., On optimization of stochastic max-min-plus-scaling systems—An approximation approach, Automatica, vol. 83, pp. 20-27, 2017.
Fidler, et al., Non-asymptotic delay bounds for multi-server systems with synchronization constraints, IEEE Transactions on Parallel and Distributed Systems, vol. 29, No. 7, pp. 1545-1559, 2018.
Giannini, et al., Asynchronous max-consensus protocol with time delays: Convergence results and applications, IEEE Transactions on Circuits and Systems I: Regular Papers, vol. 63, No. 2, pp. 256-264, 2016.
Hu, et al., Distributed tracking control of leader-follower multi-agent systems under noisy measurement, Automatica, vol. 46, No. 8, pp. 1382-1387, 2010.
Iutzeler, et al., Analysis of max-consensus algorithms in wireless channels, IEEE Transactions on Signal Processing, vol. 60, No. 11, pp. 6103-6107, 2012.
Kar, et al., Distributed consensus algorithms in sensor networks with imperfect communication: Link failures and channel noise, IEEE Transactions on Signal Processing, vol. 57, No. 1, pp. 355-369, 2009.
Lewis, et al., An introduction to large deviations for teletraffic engineers, Dublin Institute for Advanced Studies, pp. 1-45, 1997.
Li, et al., A distributed consensus-based cooperative spectrum-sensing scheme in cognitive radios, IEEE Transactions on Vehicular Technology, vol. 59, No. 1, pp. 383-393, Jan. 2010.
Li, et al., Consensus conditions of multi-agent systems with time-varying topologies and stochastic communication noises, IEEE Transactions on Automatic Control, vol. 55, No. 9, pp. 2043-2057, 2010.
Muniraju, et al., Location based distributed spectral clustering for wireless sensor networks, IEEE Sensor Signal Processing for Defense Conference (SSPD), London, 2017.
Muniraju, et al., Max consensus in the presence of additive noise, IEEE Asilomar Conference on Signals Systems and Computers, 2018.
Nejad, et al., Max-consensus in a max-plus algebraic setting: The case of fixed communication topologies, in IEEE XXII Int. Symposium on ICAT, 2009.
Nejad, et al., Max-consensus in a max-plus algebraic setting: The case of switching communication topologies, 10th International Workshop on Discrete Event Systems, 2010.
Nowzari, et al., Improved bounds for max consensus in wireless networks, IEEE Transactions on Signal and Information Processing over Networks, 2018.
Olfati-Saber, et al., Consensus and cooperation in networked multi-agent systems, Proceedings of the IEEE, vol. 95, No. 1, pp. 215-233, 2007.
Predd, et al., Distributed learning in wireless sensor networks, IEEE Signal Processing Magazine, vol. 23, No. 4, pp. 56-69, 2006.
Shi, et al., Finite-time and asymptotic convergence of distributed averaging and maximizing algorithms, arXiv preprint arXiv:1205.1733, 2012.
Sridharan, A gentle introduction to concentration inequalities, Dept Comput Sci, 2002.
Tahbaz-Salehi, et al., A one-parameter family of distributed consensus algorithms with boundary: From shortest paths to mean hitting times, in IEEE Conference on Decision and Control. IEEE, 2006.
Van De Woude, et al., Ergodic theory for stochastic max-plus linear systems with fixed structure, 2007.
Zhang, et al., Distributed network center and size estimation, IEEE Sensors Journal, vol. 18, No. 14, pp. 6033-6045. 2018.
Zhang, et al., Max consensus in sensor networks: Non-linear bounded transmission and additive noise, IEEE Sensors Journal, vol. 16, No. 24, pp. 9089-9098, 2016.
Zhang, et al., Node localization in wireless sensor networks, Synthesis Lectures on Communications, Morgan & Claypool Publishers, vol. 9, No. 1, pp. 1-62, 2016.
Zhu, et al., Mitigating quantization effects on distributed sensor fusion: A least squares approach, IEEE Transactions on Signal Processing, vol. 66, No. 13, pp. 3459-3474, 2018.

* cited by examiner

200

202 — PROVIDE A NETWORK INCLUDING N SENSOR NODES, EACH SENSOR NODE i ASSUMING AN ASSIGNED OR MEASURED STATE VALUE $x_i(t)$ AND EACH CONNECTION BETWEEN NEIGHBORING SENSOR NODES i AND j ASSUMING ADDITIVE NOISE $v_{i,j}(t)$, WHERE $i,j \in N$

204 — DETERMINE A GROWTH RATE ESTIMATE $\lambda_i$ ASSOCIATED WITH EACH RESPECTIVE SENSOR NODE i

242 — INITIALIZE STATE VALUE OF ALL SENSOR NODES TO ZERO SUCH THAT $x_i(0) = 0$

244 — UPDATE STATE VALUE OF EACH SENSOR NODE i WITH A LOCAL MAXIMUM FOR $t_{max}$ ITERATIONS SUCH THAT:
$$x_i(t) = \max\left(x_i(t), \max_{j \in \mathcal{N}_i}(x_j(t-1) + v_{ij}(t-1))\right)$$

246 — DETERMINE GROWTH RATE ESTIMATE $\lambda_i$ SUCH THAT:
$$\hat{\lambda}_i(t_{max}) = \frac{x_i(t_{max})}{t_{max}}$$

206 — DETERMINE A TRUE STATE VALUE MAXIMUM FOR EACH RESPECTIVE SENSOR NODE i OF THE PLURALITY OF N SENSOR NODES FOR EACH ITERATION t OF A PLURALITY OF $t_{max}$ ITERATIONS TO GENERATE A SET OF TRUE STATE VALUE MAXIMA

262 — MEASURE INITIAL STATE VALUE $x_i(0)$ BY EACH SENSOR NODE i

264 — UPDATE EACH SENSOR NODE i WITH A LOCAL MAXIMUM FOR $t_{max}$ ITERATIONS AND SUBTRACT GROWTH RATE ESTIMATE $\lambda_i$ SUCH THAT:
$$x_i(t) = \max\left(x_i(t), \max_{j \in \mathcal{N}_i}(x_j(t-1) + v_{ij}(t-1))\right) - \hat{\lambda}_i(t_{max})$$

208 — SELECT A FINAL STATE VALUE MAXIMUM FROM THE SET OF TRUE STATE VALUE MAXIMA

FIG. 2 of additive noise

SYSTEMS AND METHODS FOR ROBUST MAX CONSENSUS FOR WIRELESS SENSOR NETWORKS

CROSS REFERENCE TO RELATED APPLICATIONS

This is a non-provisional application that claims benefit to U.S. provisional application Ser. No. 62/959,564 filed on Jan. 10, 2020, which is herein incorporated by reference in its entirety.

FIELD

The present disclosure generally relates to wireless networks, and more specifically to systems and methods for robust max consensus for wireless sensor networks.

BACKGROUND

A wireless sensor network (WSN) is a distributed network consisting of multi-functional sensors, which can communicate with neighboring sensors over wireless channels. Estimating the statistics of sensor measurements in WSNs is necessary in detecting anomalous sensors, supporting the nodes with insufficient resources, network area estimation, and spectrum sensing for cognitive radio applications, just to name a few. Knowledge of extremes is often used in algorithms for outlier detection, clustering, classification, and localization. However, several factors such as additive noise in wireless channels, random link failures, packet loss and delay of arrival significantly degrade the performance of distributed algorithms. Hence it is important to design and analyze consensus algorithms robust to such adversities.

Although max consensus has been previously studied, the analysis of max consensus algorithms under additive channel noise and randomly changing network conditions has not received much attention. The present disclosure starts with a review of the literature on max consensus in the absence of noise. A distributed max consensus algorithm for both pairwise and broadcast communications is introduced and also provides an upper bound on the mean convergence time. Recent works consider pairwise and broadcast communications with asynchronous updates and significantly improve the tightness of the upper bound on the mean convergence time. The convergence properties of max consensus protocols have been studied for broadcast communications setting in distributed networks. The convergence of average and max consensus algorithms in time dependent and state dependent graphs have also been analyzed Asynchronous updates in the presence of bounded delays have been considered. Max-plus algebra is used to analyze convergence of max-consensus algorithms for time-invariant communication topologies in previous works, and for switching topologies in other works, both in the absence of noise. Distributed algorithms to reach consensus on general functions in the absence of noise are studied in previous works. A one-parameter family of consensus algorithms over a time-varying network has been proposed, where consensus on the minimum of the initial measurements can be reached by tuning a design parameter. A distributed algorithm to reach consensus on general functions in a network is presented in some works, where the weighted power mean algorithm is used to calculate the maximum of the initial measurements by setting the design parameter to infinity.

A system model with imperfect transmissions has also been considered, where a message is received with a probability 1−p. This model is equivalent to the time-varying graphs, where each edge is deleted independently with a probability p. However, that system model does not consider errors in transmission, but only consider transmission failures (erasures).

Other works consider the presence of additive noise in the network and propose an iterative soft-max based average consensus algorithm to approximate the maximum, which uses non-linear bounded transmissions in order to achieve consensus. This algorithm depends on a design parameter that controls the trade-off between the max estimation error and convergence speed. However, the convergence speed of this soft-max based method is limited compared to the more natural max-based methods considered herein.

It is with these observations in mind, among others, that various aspects of the present disclosure were conceived and developed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a flowchart illustrating a methodology for determining robust max consensus for the wireless sensor network of FIG. 1 by the system of FIG. 1;

DETAILED DESCRIPTION

Figure 1:
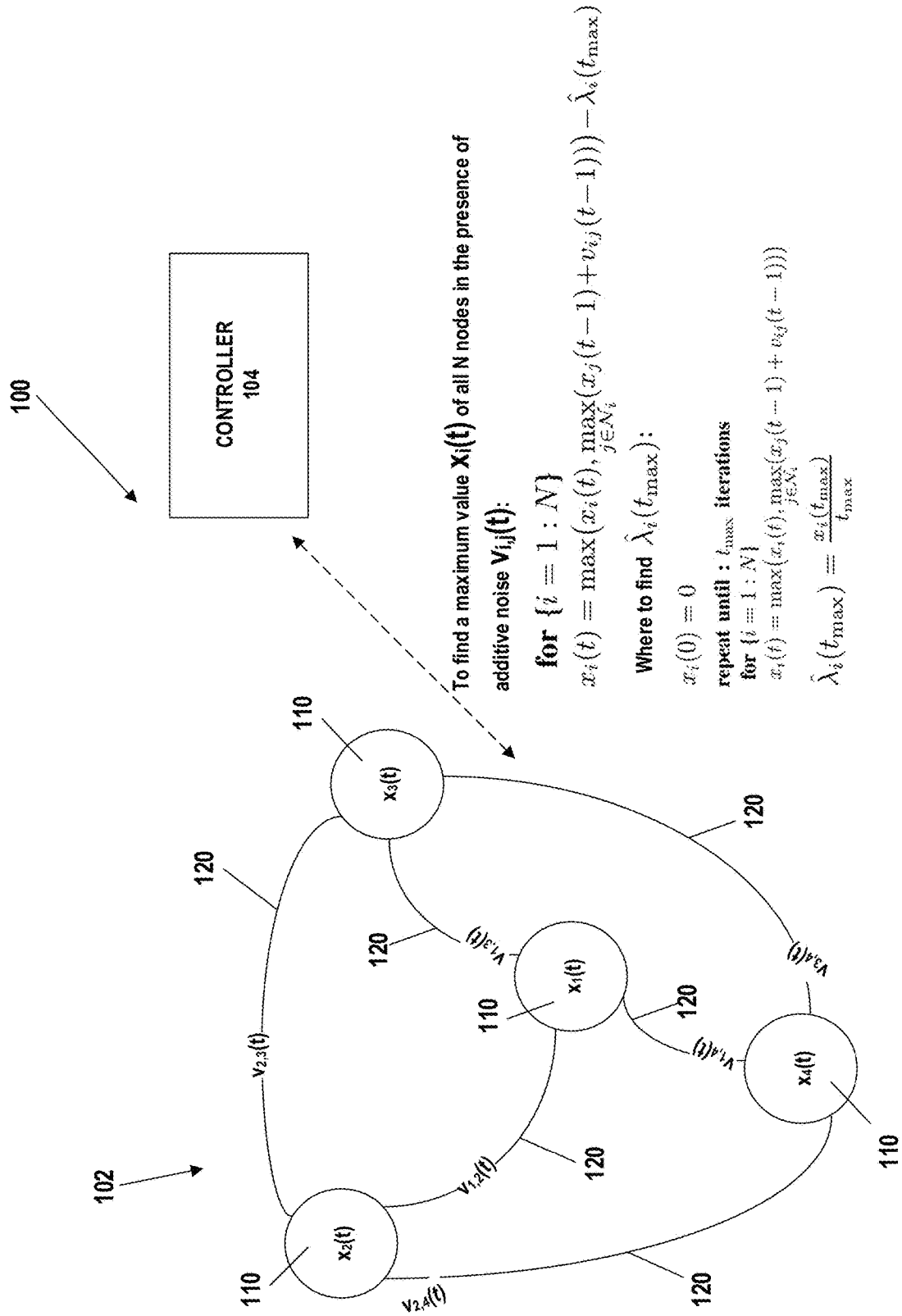
FIG. 1 is a simplified illustration showing a system for determining robust max consensus for a wireless sensor network.

The present disclosure discloses systems and methods for analysis of max consensus algorithms in the presence of additive noise and a design of fast max-based consensus algorithms executed by a processor. Due to additive noise, the estimate of the maximum at each node has a positive drift. This results in nodes diverging from the true max value. Max-plus algebra is used to represent this ergodic process of recursive max and addition operations on the state values. This growth rate has been shown to be a constant for stochastic max-plus systems using the subadditive ergodic theorem, in a mathematics context that does not consider max-consensus. In order to study the growth rate, large deviation theory is used and an upper bound is derived for a general noise distribution in the network. The upper bound is shown to depend linearly on the standard deviation, and is a function of the spectral radius of the network. Since the noise variance and spectral radius are not known locally at each node, a two-run algorithm is proposed to locally estimate and compensate for the growth rate, and analyze its variance.

Further, the present disclosure includes the complete proof of upper bound on the growth rate and also extends the analysis by deriving a lower bound. An empirical upper bound, which includes an additional correction factor that depends on number of nodes is shown to be tighter compared to previously found correction factors. Additionally, the upper and lower bounds for time-varying random graphs are derived, which model transmission failures, and additive noise. Furthermore, a method to directly calculate the upper bound, without solving for the large deviation rate function of the noise, is presented. Also, using concentration inequalities it is shown that the variance of the growth rate estimator decreases inversely with the number of iterations and this is used to bound the variance of the estimator. Through simulations, it is shown that the proposed algorithm converges much faster with lower estimation error, in comparison to existing algorithms.

System Model

A network of N nodes is considered. The communication among nodes is modeled as an undirected graph $\mathcal{G}=(\mathcal{V}, \varepsilon)$, where $\mathcal{V}=\{1, \ldots, N\}$ is the set of nodes and E is the set of edges connecting the nodes. The set of neighbors of node i is denoted by $\mathcal{N}_i=\{j|\{i,j\}\in\varepsilon\}$. The degree of the $i^{th}$ node, denoted by $d_i=|\mathcal{N}_i|$, is the number of neighbors of the $i^{th}$ node. The degree matrix D, is a diagonal matrix that contains the degrees of the nodes along its diagonal. The connectivity structure of the graph is characterized by the adjacency matrix A, with entries $|A|_{i,j}=1$ if $\{i,j\}\in\varepsilon$ and $|A|_{i,j}=0$, otherwise. Spectral radius of the network ρ, corresponds to the eigenvalue with the largest magnitude of the adjacency matrix A.

In the present disclosure, the following standard assumptions on the system model are considered:
Each node has a real number which is its own initial measurement.
At each iteration, nodes broadcast their state values to their neighbors in a synchronized fashion. The analysis and the algorithm can be extended to asynchronous networks, assuming that the communication time is small such that the collisions are absent between communicating nodes.
Communications between nodes is analog over the wireless channel and is subject to additive noise.
General model of time-varying graphs are considered, wherein, a message corrupted by additive noise is received with a probability 1−p, in order to model the imperfect communication links.

A system model with imperfect transmissions is considered where a message is received with a probability 1−p, unaffected by the communication noise. Note that, the system model is a more general model that not only considers transmission failures (erasures), but also the errors in transmission due to imperfect communication links or fading channels.

FIG. 1 illustrates an overview of the system 100 including an example network 102 in communication with a controller or processor 104. As shown, the network 102 includes a plurality of nodes 110, each node 110 interconnected by a respective wireless connection 120. Nodes 110 are each operable for measuring and/or updating a state value $x_i(t)$. Wireless connections 120 each contribute noise to the state values of their corresponding nodes 110 modeled by $v_{i,j}(t)$ where i and j are neighboring nodes.

Problem Statement

The goal is to have each node reach consensus on the maximum of the node initial measurements in a distributed network, in the presence of additive communication noise. In some existing max consensus algorithms, at each iteration a node updates its state value by the maximum of the received values from its neighbors. After a number of iterations which is on the order of the diameter of the network, each node reaches a consensus on the maximum of the initial measurements. However, this approach fails in the presence of additive noise on the communication links, because every time a node updates its state value by taking the maximum over the received noisy measurements, the state value of the node drifts.

To address this problem, max-plus algebra and large deviation theory are used to find the growth rate of the state values. An algorithm is then proposed which locally estimates the growth rate and updates the state values accordingly to reach consensus on the true maximum value.

Mathematical Background

For completeness, the mathematical background including the max-based consensus algorithm and max-plus algebra is briefly reviewed.

Review of Max-Based Consensus Algorithm

In this section, the conventional max-based consensus algorithm is described. Consider a distributed network with N nodes with real-valued initial measurements, $x(0)=[x_1(0), \ldots, x_N(0)]^T$, where $x_i(t)$ denotes the state value of the $i^{th}$ node at time t. Max consensus in the absence of noise merely involves updating the state value of nodes with the largest received measurement thus far in each iteration so that the nodes reach consensus on the maximum value of the initial measurements. Let $v_{ij}(t)$ be a zero mean, independent and identically distributed (i.i.d) noise sample from a general noise distribution, which models the additive communication noise between nodes i and j at time t. To reach consensus on the maximum of the initial state values, nodes update their state by taking the maximum over the received measurements from neighbors and their own state, given by, $$x_i(t+1) = \max(x_i(t), \max_{j \in \mathcal{N}_i}(x_i(t) + v_{ij}(t))). \quad 1)$$

Review of Max Plus Algebra

Max plus algebra, which can be used to represent max consensus algorithm as a discrete linear system, is briefly introduced. A max-plus approach was considered for max consensus in previous works but in the absence of additive noise. The approach of the present disclosure considers the presence of a general noise distribution and study its effects on equation (1) using max-plus algebra and subadditive ergodic theory.

Max plus algebra is based on two binary operations $\oplus$ $\otimes$, on the set $\mathbb{R}_{max}=\mathbb{R}\cup\{-\infty\}$. The operation are defined on x, $y\in\mathbb{R}_{max}$ as follows, $$x\oplus y=\max(x,y) \text{ and } x\otimes y=x+y$$

The neutral element for the $\oplus$ operator is $\varepsilon:=-\infty$ and for $\otimes$ operator is e:=0. Similarly for matrices $X,Y\in\mathbb{R}_{max}^{N\times N}$, operations are defined as, for i=1, ..., N. and j=1, ..., N.

$$[X\oplus Y]_{i,j}=[X]_{i,j}\oplus[Y]_{i,j},$$

$$[X\otimes Y]_{i,j}\overset{N}{\underset{k=1}{\otimes}}([X]_{i,k}\otimes[Y]_{k,j})=\max_k([X]_{i,k}+[Y]_{k,j})$$

where $[X]_{i,j}$ and $[Y]_{i,j}$ denote (i,j) element of matrices X and Y, respectively. For integers k>1, $Y(k)=Y(k-1)\otimes \ldots Y(1)$ is denoted.

Consider x(t) to be an N×1 vector with the state values of the nodes at time t. Max plus algebra can be used to represent equation (1) as, $$x(t+1) = W(t)\otimes x(t), t>0, \qquad (2)$$

$$= \underbrace{W(t)\otimes W(t-1)\otimes \ldots W(0)}_{\triangleq W(t,0)}\otimes x(0),$$

where W(t) is the N×N noise matrix at time t, with elements $$[W(t)]_{ij} = \begin{cases} e & i=j \\ \varepsilon, & \text{if } \{i,j\}\notin\mathcal{E} \\ v_{ij}(t), & \text{if } \{i,j\}\in\mathcal{E} \end{cases} \qquad (3)$$

Existence of Linear Growth

In a queuing theory and networking context, reference [17], [18] show that for a system represented by the recursive relation in equation (2), $x_i(t)$ grows linearly, in the sense there exists areal number $\lambda$ such that, for all i=1, ..., N, $$\lambda = \lim_{t\to\infty}\frac{1}{t}x_i(t) \qquad 4)$$

$$\lambda = \lim_{t\to\infty}\frac{1}{t}\mathbb{E}[x_i(t)],$$

where the first limit converges almost surely. Note that the constant $\lambda$ does not depend on the initial measurement x(0), or the node index i. It is also sometimes referred to as the max-plus Lyapunov exponent of the recursion in equation (2).

In the current WSN context, the growth of $x_i(t)$ is clearly dependent on the distribution of noise and graph topology. However, there exists no analytical expressions for the growth rate $\lambda$, even for the simplest graphs and noise distributions. Indeed this is related to a long-standing open problem in the first and last passage percolation [26] to obtain analytical expressions for $\lambda$. One of the main contributions herein is analytical bounds on $\lambda$ for arbitrary graphs and general noise distributions. Theorems are introduced to upper and lower bound the growth rate for arbitrarily connected fixed and random graphs.

Bounds on Growth Rate for Fixed Graphs

Upper Bound

To derive the upper bound on the growth rate, the following theorem is provided for fixed graphs and general noise distributions. Before stating the theorem, the following Lemma is introduced which will be later invoked in the theorem.

Lemma 1. Let A be the adjacency matrix and p be the spectral radius, then $[A^t]_{i,j}\leq p^t$.

Proof: Consider a singular value decomposition (SVD) of $A=U\Sigma V^T$ So that $A^t=(U\Sigma V^T)(U\Sigma V^T)\ldots(U\Sigma V^T)$ t times. Let $e_i$ be a unit vector of zeros, except a 1 at the $i^{th}$ position. Hence, $[A^t]_{i,j}=e_i^T(U\Sigma V^T)^t e_j$ can be written and it can be shown that $[A^t]_{i,j}\leq p^t$ by showing $|e_i^T p^{-t}A^t e_j|\leq 1$. To this end, it may be written that, $$p^{-t}A^t = (U\bar{\Sigma}V^T)^t,$$

where, $\bar{\Sigma}=p^{-1}\Sigma$ is a diagonal matrix with diagonal elements $$\left(1,\frac{p_2}{p},\ldots,\frac{p_N}{p}\right),$$

where $p_n$ is the is the $n^{th}$ largest singular value of $\Sigma$. Since U and $V^T$ are unitary, it is clear that E is a contraction so that $$\|Ux\|=\|x\|, \|V^T x\|=\|x\|, \|\bar{\Sigma}x\|\leq\|x\| \qquad 5)$$

because $$\left|\frac{p_n}{p}\right|<1,$$

for n=2, ..., t. Now, successive application of equation (5) yields, $$e_i^T p^{-t}A^t e_j = |e_i^T p^{-t}A^t e_j|$$
$$= |e_i^T(U\Sigma V^T\ldots U\Sigma V^T)e_j|\leq 1.$$

where the first equality is because A has non-negative entries and the inequality uses equation (5) and Cauchy-Schwartz inequality. Hence, $[A^t]_{i,j}\leq p^t$ which concludes the proof of Lemma 1.

Theorem 1. (Upper Bound) Suppose the moment generating function of the noise $M(\gamma):=\mathbb{E}[e^{\gamma v_{ij}(y)}]$ exists for $\gamma$ in a neighborhood of the origin. Then, an upper bound on growth rate $\lambda$ is given by, $$\lambda \leq \inf\left\{x: \sup_{0\leq\beta\leq 1}\left[H(\beta)+\beta\log(p)-\beta I\left(\frac{x}{\beta}\right)<0\right]\right\}, \qquad 6)$$

where, p is the spectral radius of the graph, H(l) is the binary entropy function given by $$H(\beta)=-\beta\log(\beta)-(1-\beta)\log(1-\beta),$$

and I(x) is the large deviation rate function of the noise, given by, $$I(x) := \sup_{\gamma>0}(x\gamma - \log(M(\gamma)))$$

Proof: The proof begins by describing the approach taken to prove the theorem. Formulating growth rate λ is taken as a function of the maximum path sum of random variables. Next, to find the maximal path sum, the number of paths in t hops are that involves l self-loops are counted. The upper bound are put in the desired form using large deviation theory. The different parts of the proof are labeled accordingly, for readability.

Relate λ and maximal path sum: To prove Theorem 1, λ is upper bounded using the elements of W(t,0) defined in equation (2). The i,j entry $[W(t,0)]_{i,j}$, can be written as the maximum of the sum of noise samples over certain paths. To be precise, let $P_t(i,j)$ be the set of all path sequences $$\{p(k)\}_{k=0}^{t},$$

the start at p(0)=j and end at p(t)=i, and also satisfies (p(k),p(k+1))∈ε or p(k)=p(k+1) for k∈{0,1, ..., t−1}, which allows self loops. For simplicity $M_t^{(i,j)} \triangleq [W(t,0)]_{i,j}$ is defined. The path sum $M_t^{(i,j)}$ corresponds to the path whose sum of i.i.d noise samples along the edges in t hops between nodes i and j, is maximum among all possible paths, is given by, $$M_t^{(i,j)} \triangleq [W(t,0)]_{i,j} = \max_{\{p(k)\}\in P_t(i,j)} \sum_{k=0}^{t} [W(k)]_{p(k),p(k+1)}. \quad 7)$$

For the system defined by the recursive relation in equation (2), let us define the growth rate of this max-plus process to be λ and derive an upper bound on λ. λ is related to $M_t^{(i,j)}$ by first recalling the definition in equation (4), $$\lambda = \lim_{t\to\infty} \frac{1}{t}x_i(t) = \lim_{t\to\infty} \frac{1}{t}\max_j\left(M_t^{(i,j)} + x_j(0)\right) \cdot \leq \quad 8)$$

$$\max_j\left(\limsup_{t\to\infty}\frac{1}{t}M_t^{(i,j)} + \limsup_{t\to\infty}\frac{x_j(0)}{t}\right) \leq \max_j \limsup_{t\to\infty} \frac{1}{t}M_t^{(i,j)}.$$

In fact, Kingman's subadditive ergodic theorem can be invoked [17] to show that the lim sup in the last inequality be replaced by a limit. Furthermore, as shown in same reference, this limit is independent of i, and j. Hence, one can work with $M_t^{(i,j)}$ instead of $x_i(t)$ to upperbound the graph-dependent constant λ. This enables us to drop the maximum over j and study the constant that $M_t^{(i,j)}/t$ converges to. Toward this goal, consider the smallest value of x for which $$\lim_{t\to\infty} P\left[\frac{1}{t}M_t^{(i,j)} > x\right] = 0. \quad 9)$$

This probability is upperbounded to find bounds on such values of x.

Count the number of paths with l self-loops: Examining equation (7) it is observed that, for a self-loop at time k, p(k)=p(k+1). Since $[W]_{i,i}(k)$=e=0, there is no contribution to the sum in equation (7), as self-loops are not affected by the noise. So it is useful to express the maximum in equation (7) over the paths that have a fixed number of self-loops l. To study this case, the number of paths that contain l self loops are counted. Consider the expression $[(A+zI)^t]_{i,j}$, where z is an indeterminate variable that will help count the number of paths from node i to node j in t steps that go through a fixed number of l self-loops. Using the binomial expansion, the following can be written:

$$[(A=zI)^t]_{i,j} = \sum_{l=0}^{t} z^l[A^{t-l}]_{i,j}\binom{t}{l}$$

where co-efficient of $z^l$ is the number of paths from node i to j in t steps, that go through l self loops denoted as $$n_l = \binom{t}{l}[A^{t-l}]_{i,j}.$$

Upper bound the growth rate λ: Now the following can be written, $$\frac{1}{t}M_t^{(i,j)} = \max_{l \in \{0,1,\ldots,t-1\}} \max\left(\frac{S_1^{(l)}}{t}, \ldots, \frac{S_{n_l}^{(l)}}{t}\right) \quad 10)$$

where $S_q^{(l)}$ is any sum in equation (7) that involves l self loops, q∈{1, ..., $n_l$} and $n_l$ is the number of paths in $P_t(i,j)$ with l self-loops. Substituting equation (10) into equation (9) and using the union bound, equation (9) can be upper bounded as, $$P\left[\max_l \max\left(\frac{s_1^{(l)}}{t}, \ldots, \frac{s_{n_l}^{(l)}}{t}\right) > x\right] \leq \sum_{l=0}^{t}\sum_{q=1}^{n_l} P\left[\frac{1}{t}S_q^{(l)} > x\right] \quad 11)$$

Since $S_q^{(l)}$ are sum of (t−l) i.i.d random variables, $S_q^{(l)}$ is i.i.d in q for a fixed l, but differently distributed for different l, so the index q can be dropped and the sum over q can be replaced with $n_l$ to get, $$P\left[\frac{1}{t}M_t^{(i,j)} > x\right] \leq \sum_{l=0}^{t} n_l \cdot P\left[\frac{1}{t}S^{(l)} > x\right], = \sum_{l=0}^{t}\binom{t}{l}[A^{t-l}]_{i,j}P\left[\frac{1}{t}S^{(l)} > x\right] \quad 12)$$

From Lemma1, $[A^{t-l}]i,j \leq p^{t-l}$ and letting $$l^* = \operatorname*{argmax}_{l}\binom{t}{l}p^{t-l}P\left[\frac{S^{(l)}}{t} > x\right]$$

in equation (12), $$P\left[\frac{1}{t}M_t^{(i,j)} > x\right] \le (t+1)\binom{t}{l^*}p^{t-l^*}P\left[\frac{S^{(l^*)}}{t} > x\right] \quad (13)$$

$$P\left[\frac{S^{(l^*)}}{t} > x\right]$$

can be rewritten as $$P\left[\frac{S^{(l^*)}}{t-l^*} > \frac{t}{t-l^*}x\right].$$

In the next step,
the second term can be bounded on RHS of equation (13) by the Chernoff bound as, $$P\left[\frac{S^{(l^*)}}{t-l^*} > \frac{t}{t-l^*}x\right] = e^{-t(1-\alpha)I\left(\frac{x}{1-\alpha}\right)}$$

where I(x) is the large deviation rate function and $\alpha = l^*/t$. For large t, $$\binom{t}{\alpha t} = e^{(t(H(\alpha) + o(1)))},$$

$\alpha t$ where $H(\alpha) = -\alpha \log(\alpha) - (1-\alpha)\log(1-\alpha)$. For convenience let $\beta = 1-\alpha$, then equation (13) reduces to, $$P\left[\frac{1}{t}M_t^{(i,j)} > x\right] \le (t-1)e^{t(H(\beta) + \beta\log(\rho) - \beta I(x/\beta) + o(1))} \quad (14)$$

It is well-known that the large-deviation rate function $I(\cdot)$ is monotonically increasing to infinity for arguments restricted above the mean of the random variable (zero-mean noise in this case), so the exponent in equation (14) will be negative when x is large enough. Hence the smallest x for which equation (14) goes to zero exponentially is given by equation (6). This concludes the proof of the Theorem ■.

Simplified upper bound for Gaussian noise: If the noise is Gaussian, i.e $v_{ij} \sim \mathcal{N}(0,1)$, then $$I(x) = \frac{x^2}{2}$$

in equation (6). Using algebra, equation (6) simplifies as, $$\lambda \le \sup_{0 \le \beta \le 1} \sqrt{2\beta(H(\beta) + \beta\log(\rho))} \quad (15)$$

Defining $g(\beta) = \sqrt{2\beta(H(\beta) + \beta\log(\rho))}$, the supremum will be achieved for $\beta$ that satisfies $$\frac{\partial g(\beta)}{\partial \beta} = 0,$$

which simplifies to $$\rho = \sqrt{\frac{\beta}{1-\beta}}e^{-\frac{H(\beta)}{2\beta}}$$

Note that, $I(\cdot)$ is a convex function and as $\rho$ increases $\beta$ will approach its upper limit of 1. Therefore, it can be concluded that for graphs with large $\rho$, the optimal value of $\beta \to 1$, hence it can be written that, $$H(\beta) + \beta\log(\rho) - \beta I(x/\beta) \approx \log(\rho) - I(x) \quad 16)$$

which is negative when $I(x) > \log(p)$.

This behavior of $\beta$ may be established for the Gaussian case. However this holds more generally. Since $f(x,\beta) = H(\beta) + \beta\log(\rho) - \beta I(x/\beta)$ is concave in $\beta$ for every x, this must only be checked when x>0, the $\beta^*$ that solves $$\frac{\partial f(x,\beta^*)}{\partial \beta} = 0$$

approaches 1 as $\log(\rho)$ increases. Setting the derivative to 0:

$$\log\left(\frac{1-\beta}{\beta} + \log(\rho) - I(x/\beta) + \frac{x}{\beta}I'(x/\beta) = 0\right)$$

One can check that as $\rho$ increases, $\log(\rho) \to \infty$ and hence, $$\log\left(\frac{1-\beta}{\beta}\right) \to -\infty$$

which is reached as $\beta \to 1$. This shows that as $\rho$ increases, $\beta = 1$ for general noise distributions as well.

Alternative upper bound: Recall that, while proving Theorem 1, the path from node i to j in t steps, whose sum was the maximum among all possible paths, was of interest. To achieve this, first the number of paths from node i to j in t steps were counted and then, these paths were grouped in terms of number of paths that involved self-loops. Note that, self-loops were not affected by noise so their contribution to the sum along the path is 0. The analysis would be simpler if noise on self loops was considered, thereby eliminating the need to count and group the paths by number of self loops involved. So considering noise on self-loops, which is equivalent to setting $\beta = 1$ in Theorem 1, would result in the following recursion, $$x_i(t+1) = \max\left(x_i(t) + v_{ii}(t), \max_{i \in \mathcal{N}_i}(x_j(t) + v_{ij}(t))\right) \quad 17)$$

instead of equation (1). Note that, equation (17) is not the proposed max consensus scheme, but an auxiliary recursion used here to upper bound the growth rate. It can be observed that $x_{ij}(t+1)$ is convex in $v_{ii}(t)$, and due to Jensen's inequality the additional noise in equation (17) can only increase the slope $\lambda$ compared to equation (1). Hence, the growth rate of equation (1) is upper bounded by that of equation (17). Repeating the proof of Theorem 1 for this case amounts to replacing A by A+I and therefore $\rho$ with $\rho+1$, so the following is true:

Theorem 2. The auxiliary recursion in equation (17) has a growth rate upper bounded by the value of x>0 that solves, $$I(x) = \log(\rho+1) \qquad (18)$$

where I(x) is the large deviation rate function. Moreover, this value of x upper bounds the growth rate $\lambda$ of the recursion in equation (1).

Note that, for Gaussian noise distribution the alternative upper bound on the growth rate can be calculated as, $$\lambda \leq \sqrt{2\log(\rho+1)} \qquad (19)$$

While equation (19) is a looser bound than equation (15), it is much simpler. As $\rho$ increases, i.e. as $\beta \to 1$, alternative upper bound and exact upper bound converge.

Lower Bound

While it is clear that $\lambda \geq 0$, it is not obvious when $\lambda \geq 0$. In this section, lower bound is derived, which, in part, shows that there exists a growth rate $\Delta$ due to additive noise in the network, which is always positive ($\lambda.0$). Also, the lower bound relates to the order statistics of the underlying noise distribution as well as the steady state distribution of the underlying Markov chain.

Lower bound for regular graphs: Recall that the state of the $i^{th}$ sensor at time t+1 is given by the $i^{th}$ element of the vector, $x(t+1) = W(t,0) \otimes x(0)$ which is, $$x_i(t+1) = \max_j \left([W(t,0)]_{i,j} + x_j(0)\right), \geq \max_j \left([W(t,0)_{i,j} + x_{min}(0)\right), \qquad (20)$$

Where $$x_{min}(0) = \min_i x_i(0).$$

Now, using equation (20), the growth rate $\lambda$ is lower bounded as, $$\lambda = \lim_{t \to \infty} \frac{x_i(t)}{t} = \qquad (21a)$$

$$\lim_{t \to \infty} \frac{x_i(t+1)}{t} \geq \lim_{t \to \infty} \frac{1}{t} \max_j [W(t,0)]^{i,j} + \lim_{t \to \infty} \frac{1}{t} x_{min}(0)$$

$$\geq \lim_{t \to \infty} \frac{1}{t} \sum_{k=0}^{t-1} [W(k)]_{p(k),p(k+1)} \qquad (21b)$$

where equation (21a) is due to equation (20) and in equation (21b), $\{p(k)\}_{k=0}^t$ is any path that satisfies $p(0)=j$ and $p(t)=i$. In order to get a good lower bound, evaluating equation (21b) is relied upon for a specific path defined as, $$p(k+1) = \underset{m \in \mathcal{N}(p(k)) \cup p(k)}{\operatorname{argmax}} [W(k)]^{p(k),m}. \qquad (22)$$

This amounts to selecting the locally optimum or greedy path. If the graph is d-regular, then with p(k) chosen as in equation (22), the random variables in equation (21b) are distributed the same as the maximum of d i.i.d random variables and zero, whose expectation is denoted as $m_+(d)$. Therefore, due to law of large numbers, equation (21b) converges to, $$\lambda \geq m_+(d) = \mathbb{E}\left[\max\left(0, \max_m [W(k)]^{p(k),m}\right)\right] = d\int_0^\infty xF^{d-1}(x)f(x)dx \qquad (23)$$

where $F(\cdot)$ and $f(\cdot)$ are the CDF and PDF of the noise respectively. Also, one can lower bound growth rate with a simple expression given by, $$\lambda \geq F^{-1}\left(\frac{d}{d+1}\right),$$

provided that median of noise samples are zero.

Lower bound for irregular graphs: For irregular graphs, the path defined in equation (22) is a random walk on the graph with the corresponding sequence of nodes constituting a Markov chain. When the graph is irregular, the transition probabilities of this Markov chain depend on the degree of the current node. Specifically, the transition probability matrix is given by, $$P = (1-k)D^{-1}A + kI$$

where the diagonal matrix $[D]_{i,j} = d_i$, degree of node i, so $$[P]_{i,j} = \begin{cases} \frac{1-k}{d_i} i \neq j, & (i,j) \in \mathcal{E} \\ k & i = j, \end{cases} \qquad (24)$$

where k is the probability that noise samples on neighboring edges of node i are negative, given by $$k = P[[W(k)]_{i,j} < 0, \forall j] = d_i \int_{-\infty}^0 F^{d_i-1}(x)f(x)dx$$

Let the steady state probabilities of this Markov chain be denoted by $\pi_i$. Then, using the law of large numbers the lower bound is given by, $$\lim_{t \to \infty} \frac{1}{t} \sum_{k=10}^{t-1} \max_m \left([W(k)]_{p(k),m}\right) = \sum_{i=1}^N \pi_i m_+(d_i), \qquad (25)$$

since the random variable $$\max_m \left([W(k)]_{p(k),m}\right)$$

has expectation $m_+(d_i)$, given node i. One can find a closed form expression for $\pi_i$ as $$\pi_i = \frac{d_i}{2E},$$

where $E:=|\mathcal{E}|$ is the total number of edges in the network. To verify this, one can check that $\pi^T P = \pi^T$, where $\pi^T = [\pi_1, \ldots, \pi_N]$, using equation (24). In conclusion, the lower bound on the growth rate for irregular graphs is given by, $$\lambda \geq \sum_{i=1}^{N} \frac{d_i}{2E} m_+(d_i). \qquad 26)$$

Bounds on Growth Rate for Random Graphs

In this section the case is considered where each edge is absent by a probability of p, independently across edges and time, which models random transmission failures.

Upper Bound for Random Graphs

It is now shown that the upper bound on growth rate for the randomly changing graphs can be simply obtained by replacing p in the fixed graph case by $\rho(1-p)$ in equation (6), where p is the Bernoulli probability, that any edge will be deleted independently at each iteration.

Recall that in fixed graph model, W(k) had zero (e) along the diagonal and $[W(k)]_{l,m} = v_{lm}(k)$ was the underlying i.i.d noise random variables when $(l,m) \in \varepsilon$. The random graph can be described as, $$[W(k)]_{lm} = \begin{cases} v_{l,m}(k) \text{ with } prob \ (1-p) \text{ if } (l,m) \in \varepsilon \\ -C \text{ with } prob \ p \text{ if } (l,m) \in \varepsilon \\ e \ l = m \\ \varepsilon \text{ if } (l,m) \notin \varepsilon \end{cases} \qquad 27)$$

where C is a large positive constant which captures randomly absent edge as $C \to \infty$. Note that, since each node is maxing with itself at each iteration in equation (1), the large negative value of $-C$, will never propagate through the network, which is equivalent to deleting an edge, for large C.

Following the analysis of the fixed graph case, only the moment generating function of the noise samples changes to, $$M(\gamma, C) = p e^{-C\gamma} + (1-p) M(\gamma),$$

where $M(\gamma)$ is the original moment generating function of the noise samples given by $M(\gamma) = \mathbb{E}[e^{\gamma v_{ij}(k)}]$. The corresponding rate function is given by $$I(x, C) = \sup_{\gamma > 0} (x\gamma - \log(M(\gamma, C)))$$

Following the proof of Theorem 1, to upper bound the growth for this case the smallest x is found that satisfies, $$\lim_{C \to \infty} \sup_{0 \leq \beta \leq 1} \left( H(\beta) + \beta \log(\rho) - \beta I\left(\frac{x}{\beta}, C\right) < 0 \right)$$

Consider $$f(x, \beta, C) = H(\beta) + \beta \log(\rho) - \beta I\left(\frac{x}{\beta}, C\right),$$

since $f(x, \beta, C)$ is convex in C and concave in $\beta$ it can be written that.

$$\inf_{C} \sup_{0 \leq \beta \leq 1} f(x, \beta, C) = \qquad 28)$$

$$\sup_{0 \leq \beta \leq 1} \inf_{C} f(x, \beta, C) = \sup_{0 \leq \beta \leq 1} \lim_{C \to \infty} f(x, \beta, C) =$$

$$\sup_{0 \leq \beta \leq 1} \left( H(\beta) + \beta \log(\rho(1-p)) - \beta I\left(\frac{x}{\beta}\right) < 0 \right),$$

where the first equality is due to classical minimax theorem, and second due to the monotonicity of $f(x, \beta, C)$ in C. Hence, the upper bound can be written as, $$\lambda \leq \inf \left\{ x : \sup_{0 \leq \beta \leq 1} \left[ H(\beta) + \beta \log(p(1-p)) - \beta I\left(\frac{x}{\beta}\right) < 0 \right] \right\} \qquad 29)$$

Interestingly, this is precisely the upper bound for fixed graphs except that $\rho(1-p)$ instead of $\rho$. While for a fixed graph $\rho \leq 1$ always holds, in random graphs case it is possible to have $\rho(1-p) < 1$. If $\rho(1-p) \approx 0$ then it is easy to check in equation (29) that the optimizing $\beta$ is near zero. This can be contrasted with the case where $\rho$ is large and the optimizing $\beta$ was found to satisfy $\beta \approx 1$.

Lower Bound for Random Graphs

Here, the lower bound on the growth rate for randomly changing graphs is derived. Recall that, for the path defined in equation (22), and when W(k) is as defined in equation (27), yields a lower bound on the growth rate, for graphs with edge deletion probability of p.

Compared to equation (26), the only difference in the derivation is that, the node i will now have a random degree $Z_i$, which is binomial with parameters $(d_i, 1-p)$. Due to law of large numbers, equations (25)-(26) have an additional expectation with respect to this binomial distribution, resulting in following expression, $$\lambda \geq \sum_{i=1}^{N} \pi_i \mathbb{E}[m_+(Z_i)] = \sum_{i=1}^{N} \frac{d_i}{2E} \sum_{k=0}^{d_i} \binom{d_i}{k} p^{d_i - k} (1-p)^k m_+(k) \qquad 30)$$

Note that, in equation (30), $\pi_i = d_i/2E$ still holds, since the transition probabilities of the Markov chain are still of the form as in equation (24).

Upper Bound on Growth Rate without Calculating I(x)

In this section, a technique is presented to directly calculate the upper bound on growth rate using the moment generating function, without having to compute the large deviation rate function of the additive noise distribution.

Recall that the upper bound on growth rate is given by equation (29) where, p=0 for fixed graphs. For convenience, let $K \triangleq \rho(1-p)$ and $\tilde{f}(\beta, x) = H(\beta) + \beta \log(K) - \beta I(x/\beta)$. Since, $$I(x) = \sup_{\gamma > 0} (x\gamma - \log M(\gamma)),$$

it can be written, $$\sup_{0 \leq \beta \leq 1} \overline{\mathcal{F}}(\beta, x) = \qquad (31)$$
$$\inf_{\gamma > 0} \sup_{0 \leq \beta \leq 1} (H(\beta) + \beta \log(K) - x\gamma + \beta \log M(\gamma))$$

where minimax theorem is used to interchange the infimum and supremum, since log M(γ) is always convex. The inner supremum can be solved in closed form as, $$\beta^* = \frac{KM(\gamma)}{1 + KM(\gamma)}, \qquad (32)$$

which yields, $$\sup_{0 \leq \beta \leq 1} \overline{\mathcal{F}}(\beta, x) = \inf_{\gamma > 0} (H(\beta^*) + \beta^* \log(KM(\gamma)) - x\gamma).$$

So, $$\inf_x \left\{ x : \sup_{0 \leq \beta \leq 1} \overline{\mathcal{F}}(\beta, x) < 0 \right\} = \inf_{\gamma > 0} \left( \frac{1}{\gamma} H(\beta^*) + \frac{\beta^*}{\gamma} \log(KM(\gamma)) \right) \qquad (33)$$

Note that β* is also a function of γ. This technique is very useful to calculate growth rate, when I(x) is difficult to evaluate, or unavailable.

Empirical Upper Bound on Growth Rate

In this Section, an empirical correction factor to the upper bound is proposed which improves the tightness of the bound, for all network settings and noise distributions. In order to improve the tightness of the upper bound, a correction factor φ is introduced to the upper bound in equation (6). The correction factor φ depends only on number of nodes N in the network, given by, $$\phi = 1 - \frac{1}{2\sqrt{N}}, \qquad (34)$$

and multiplies the upper bound in equation (6).

While there may be no proof that this correction will always yield an upper bound, the choice of φ was empirically validated over different graph topologies and noise distributions, and in all settings, φ improved the tightness of the bound. The intuition is that the approximations made in deriving the upper bound leads to a minor deviation in the tightness for smaller N, which can be fixed by φ. Note that, as N→∞, the compensation variable φ→1, hence φ mainly contributes for graphs with smaller number of nodes.

The tightness of upper bound in equation (6) is compared to the empirical bound, illustrating the accuracy of the correction factor φ.

| Algorithm 1 Robust Max consensus Algorithm | |
|---|---|
| 1: | First run :: |
| 2: | Input: iterations = t, # of nodes = N |
| 3: | Initialization |
| 4: | Initialize all nodes to zero, $x_i(0) = 0$ |

| Algorithm 1 Robust Max consensus Algorithm | |
|---|---|
| 5: | repeat until : $t_{max}$ iterations |
| 6: | for {i = 1 : N} |
| 7: | $x_i(t) = \max\left(x_i(t), \max_{j \in N_i}(x_j(t-1) + v_{ij}(t-1))\right)$ |
| 8: | end : for |
| 9: | end : repeat |
| 10: | growth rate estimate: $\hat{\lambda}_i(t_{max}) = \frac{x_i(t_{max})}{t_{max}}$ |
| 11: | Second run :: |
| 12: | Input: # of nodes = N, Initial state: $x_i(0)$ |
| 13: | repeat until : convergence |
| 14: | for {i = 1 : N} |
| 15: | $x_i(t) = \max\left(x_i(t), \max_{j \in N_i}(x_j(t-1) + v_{ij}(t-1))\right) - \hat{\lambda}_i(t_{max})$ |
| 16: | end : for |
| 17: | end : repeat |

Robust Max Consensus Algorithm

Max consensus algorithms in existing works fail to converge in the presence of noise, as there is no compensation for the positive drift induced by the noise. Some works develop a soft-max based average consensus (SMA) approach to approximate the maximum and compensate for the additive noise. However, those algorithms are sensitive to a design parameter, which controls the trade off between estimation error and convergence speed. So, a fast max-based consensus algorithm is developed in this section, which is informed by the fact that there is a constant slope λ, analyzed in the previous sections, which can be estimated and removed. This makes the algorithm robust to the additive noise in the network.

If the knowledge of the spectral radius of the network and noise variance is known, then by using Theorem 1, one can closely estimate the growth rate and subtract this value at each node after the node update. However, the noise variance and the spectral radius are not always known locally at each node. Hence, a fast max consensus algorithm generalized to unknown noise distributions is proposed, as described in Algorithm 1, where slope is being locally estimated at each node. The variance of this estimator is also analyzed.

The algorithm consists of two runs, where in the first run, the state values of all the nodes are initialized to zero and run the max consensus algorithm in the additive noise setting. This can be performed by a simple reset operation, which is available at every node and then initiate the conventional max consensus algorithm. Note that, in this case the true maximum is zero, but due to the additive noise, the state values grow at the rate of λ. The growth rate estimate for node i is denoted by $\hat{\lambda}_i$, is computed locally over $t_{max}$ iterations as, $$\hat{\lambda}_i(t_{max}) = \frac{1}{t_{max}} x_i(t_{max}), \qquad (35)$$

the average increment in the state value of node i. Note that, this estimation is done locally at every node. Also, the algorithm is memory-efficient, since the history of state values is not used, and only the information of the iteration index and the current state value is needed to estimate the growth rate.

In the second run, max consensus algorithm is run on the actual measurements to find the maximum of the initial readings. The growth rate estimate $\hat{\lambda}_i$ is used to compensate for the error induced by the additive noise as given in line (15) of Algorithm 1. Note that, the estimator is independent of the type of additive noise distribution.

To clarify, FIG. 2 shows a methodology 200 for determining max consensus in a wireless distributed network. At block 202, a network is provided including N sensor nodes, each sensor node i assuming an assigned or measured state value $x_i(t)$ and each connection between neighboring sensor nodes i and j assuming additive noise $v_{i,j}(t)$, where i,j∈ n. At block 204, a growth rate estimate A associated with each respective sensor node i is determined. Block 204 spawns three sub-blocks 242, 244 and 246; at block 242 the state value $x_i(t)$ of all sensor nodes are initialized to zero such that $x_i(0)=0$. This step is crucial as it allows direct measurement of sensor drift; any nonzero state value updated in further iterations based on $x_i(0)=0$ is due to sensor drift, network anomalies or noise from neighboring channels, allowing the system to fully characterize the growth rate estimate in the presence of zero sensor measurement. At block 244, the state values $x_i(t)$ are updated for each sensor node i with local maximum for $t_{max}$ iterations such that $$x_i(t) = \max\left(x_i(t), \max_{j \in N_i}(x_j(t-1) + v_{ij}(t-1))\right).$$

This step mirrors a typical max consensus algorithm, however as discussed above the initial sensor node state values were set to zero. At block 246, the growth rate estimate $\hat{\lambda}_i$ is determined such that $$\hat{\lambda}_i(t_{max}) = \frac{x_i(t_{max})}{t_{max}}.$$

In a perfect world with no communication noise, sensor drift or other network anomalies, $x_i(t_{max})$ when $x_i(0)=0$ would hypothetically be zero, as the maximum state value held by the sensor nodes from time t=0 would always be zero. Since this is not the case, nonzero $x_i(t_{max})$ is a false value due to sensor drift, communication noise, or other network anomalies.

Once the growth rate estimate $\hat{\lambda}_i$ has been determined, a true state value maximum for each node can be estimated by running the iteratively updating max consensus methodology again, however this time with true initial sensor state values and by removing the growth rate estimate from each state value at each iteration. This is shown in block 206, which includes determining a true state value maximum for each respective sensor node i of the plurality of N sensor nodes for each iteration t of a plurality of $t_{max}$ iterations to generate a set of true state value maxima. At sub-block 262 of block 206, the initial state values $x_i(0)$ are directly measured by each sensor node i. At sub-block 264 of block 206, each sensor node i is updated with a local maximum for $t_{max}$ iterations and subtracting growth rate estimate A such that $$x_i(t) = \max\left(x_i(t), \max_{j \in N_i}(x_j(t-1) + v_{ij}(t-1))\right) - \hat{\lambda}_i(t_{max}).$$

This step yields a set of true state value maximums with growth rates due to noise removed, one for each node at each iteration. At block 208, a final state value maximum is selected from the set of true state value maximums, the final state value maximum being the maximum of the set of true state value maximums.

Performance Analysis

To address the accuracy of the estimate in equation (35) over a finite number of iterations, Efron-Stein's inequality is used to show that the variance of the growth rate estimator $\hat{\lambda}_i(t_{max})$ decreases as $\mathcal{O}(t_{max})$, where $t_{max}$ is number of hops. For completeness, the Efron-Stein inequality is introduced in the following theorem.

Theorem 3. Let $X_1, X_2, \ldots, X_n$, be independent random variables and let X be an independent copy of $X_q$, for q≥1. Let $Z=f(X_1, X_2, \ldots, X_q, \ldots, X_n)$ and $$Z_q' = f(X_1, X_2, \ldots, X_{q-1}, X_q, X_{q+1}, \ldots, X_n)$$

then $$\mathrm{Var}(Z) \leq \sum_{q=1}^{n} \mathbb{E}[((Z - Z_q^1{}_+)^2)],$$

where $(Z - Z_q')_+ = \max((0, Z - Z_q'))$.

The following theorem bounds the variance of the growth rate estimator.

Theorem 4. The Variance of the growth rate estimator $\hat{\lambda}_i(t_{max})$ satisfies, $$\mathrm{Var}(\hat{\lambda}_i(t_{max})) \leq \frac{\sigma^2}{t_{max}}, \tag{33}$$

where $t_{max}$ is number of iterations and $\sigma^2 = \mathrm{Var}(v_{ij}(t))$.

Proof: Using equation (35), and recalling from Theorem 1, the expression for $x_i(t_{max})$ with zero initial conditions $x_i(0)=0$ is $$\hat{\lambda}_i(t_{max}) = \frac{1}{t_{max}}\left(\max_{\{p(k)\} \in \bigcup_j P_{t_{max}}(i,j)} \sum_{k=0}^{t_{max}} [W(k)]_{p(k), p(k+1)}\right). \tag{36}$$

Next, Theorem 3 is used to bound the variance of equation (36). For simplicity of notation, set $Z=\hat{\lambda}_i(t_{max})$, which depends on noise samples $v_{ij}(t)$ through $W(k)$ in equation (36). So the independent random variables $X=\{X_1, X_2, \ldots, X_n\}$ in Theorem 3 correspond to re-indexing of $v_{ij}(t)$, with n denoting the total number of noise samples that influence $\hat{\lambda}_i[t_{max}]$, which is approximately n≈($t_{max}$+1), where E=|ε| is the total number of edges (the exact value of n depends on the graph topology). $Z_q$ is set to be given by equation (36) when the noise sample $v_{ij}(t)$ corresponding to $X_q$ is replaced by an independent copy $X_q$. Note that the path that maximizes equation (36) corresponds to a subset $\mathcal{M}(\mathcal{X})$ of $\{1, \ldots, n\}$, with $t_{max}$ elements.

If q, ∉ $\mathcal{M}(\mathcal{X})$ then the maximal path is un-affected, so $Z - Z_q' \leq 0$ and $(Z - Z_q')=0$. Hence, the analysis is simplified by considering only q, ∉ $\mathcal{M}(\mathcal{X})$, so that Theorem 3 can be simplified from involving n terms in the upper bound to only $t_{max}$ terms:

$$\text{Var}(Z) \leq \mathbb{E}_X\left[\sum_{q\in\mathcal{M}(\mathcal{X})} \mathbb{E}[((Z-Z'_q)_+)^2|\mathcal{X}]\right], \quad (37)$$

$$= \mathbb{E}_X\left[\sum_{q\in\mathcal{M}(\mathcal{X})} \mathbb{E}[((Z-Z'_{q_+}))^2|X_q \geq X'_q|\mathcal{X}]P[(X_q \geq X'_q) \mid \mathcal{X}] + \right.$$

$$\left. \sum_{q\in\mathcal{M}(\mathcal{X})} \mathbb{E}[((Z-Z'_{q_+}))^2|X_q < X'_q|\mathcal{X}]P[(X_q < X'_q) \mid \mathcal{X}]\right],$$

where the equality is due to the total expectation theorem. Note that, for $q\in \mathcal{M}(\mathcal{X})$ and $X_q < X'_q$, the maximal path remains the same and $(Z-Z'_q)_+ = 0$. Using $P[(X_q \geq X'_q)| \mathcal{X}] = \frac{1}{2}$ in equation (37) reduces to, $$\text{Var}(Z) \leq \frac{1}{2}\mathbb{E}_X \sum_{q\in\mathcal{M}(\mathcal{X})} \mathbb{E}[((Z-Z'_q)_+)^2|X_q \geq X'_q|\mathcal{X}] \leq \quad (38)$$

$$\frac{1}{2}\mathbb{E}_X \sum_{q\in\mathcal{M}(\mathcal{X})} \mathbb{E}\left[\left(\frac{1}{t_{max}}(X_q - X'_q)_+\right)^2 \Big| X_q \geq X'_q |\mathcal{X}\right]$$

where $Z-Z'_q = (X_q-X'_q)/t_{max}$ is used, if the maximal path does not change when $X$ is substituted for $X_q$; if on the other hand the maximal path changes then, $Z-Z'_q \leq (X_q-X'_q)/t_{max}$, which can be verified by considering a substitution of $X_q'$ in the original path which is smaller than $Z_q'$. It is straightforward to show that the RHS of equation (38) is given by $\sigma^2/t_{max}$, which concludes the proof.

In order to bound the variance of the max-consensus algorithm, Theorem 4 is used to write $x_i(t)$ in the first run of the algorithm with zero initial measurements as, $$x_i(t) = \lambda t + \sigma\sqrt{tY_t} \quad (39)$$

where $Y_t$ is an auxiliary random variable with $\text{Var}(Y_y) \leq 1$, which is clearly equivalent to Theorem 4 after using $\hat{\lambda}_i(t_{max}) = x_i(t)/t$.

In the second run of the algorithm after D iterations, where D is the diameter of the network, all nodes converge on the maximum of the initial measurements. Hence the estimator $\tilde{X}_i(t_{max})$ can be written as, $$x_i(D) = (\lambda - \hat{\lambda}_i(t_{max}))D + \sigma\sqrt{DY_D} + x_{max}(0), \quad (40)$$

where it is known that, $$\hat{\lambda}_i(t_{max}) = \lambda + \frac{\sigma}{\sqrt{t_{max}}} V_{t_{max}} \quad (41)$$

where $V_{t_{max}}$ is an auxiliary random variable with $\text{Var}(V_{t_{max}}) \leq 1$. Since the two runs involve independent noise samples, substituting equation (41) into equation (40) gives, $$\text{Var}(x_i(D)) \leq \sigma^2\left(\frac{D^2}{t_{max}} + D\right). \quad (42)$$

This shows that the variance of the estimator scales linearly with the diameter of the network, as long as $t_{max}$ also scales linearly with D.

Simulation Results

Figure 3:
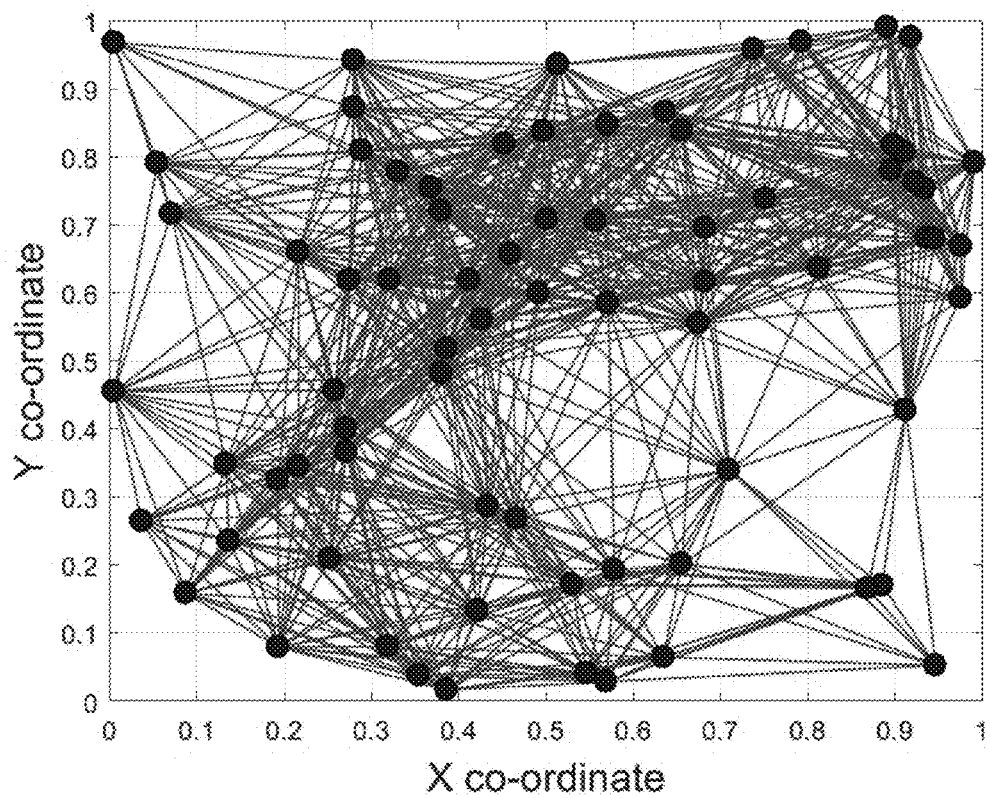
FIG. 3 is a graphical depiction of a network with=75 nodes.

A distributed network with N=75 nodes is considered, as shown in FIG. 3. This irregular graph was randomly generated, which is commonly followed. The spectral radius of the graph generated was computed to be $\rho=30.56$. Two graph topologies are considered for the simulations:

Fixed graphs: by selecting p=0 as in FIG. 3.

Time-varying graphs (Random graphs): by selecting p=0.5.

Communication links between any two nodes has a noise component distributed as $\mathcal{N}(0,1)$. First, all nodes are initialized to 0 and the max consensus algorithm is run to estimate growth rate, $[t_{max}]$ as in line 10 of the algorithm. Note that, following results are Monte-Carlo averaged over 500 iterations.

Efficiency of the Bounds

Figure 4:
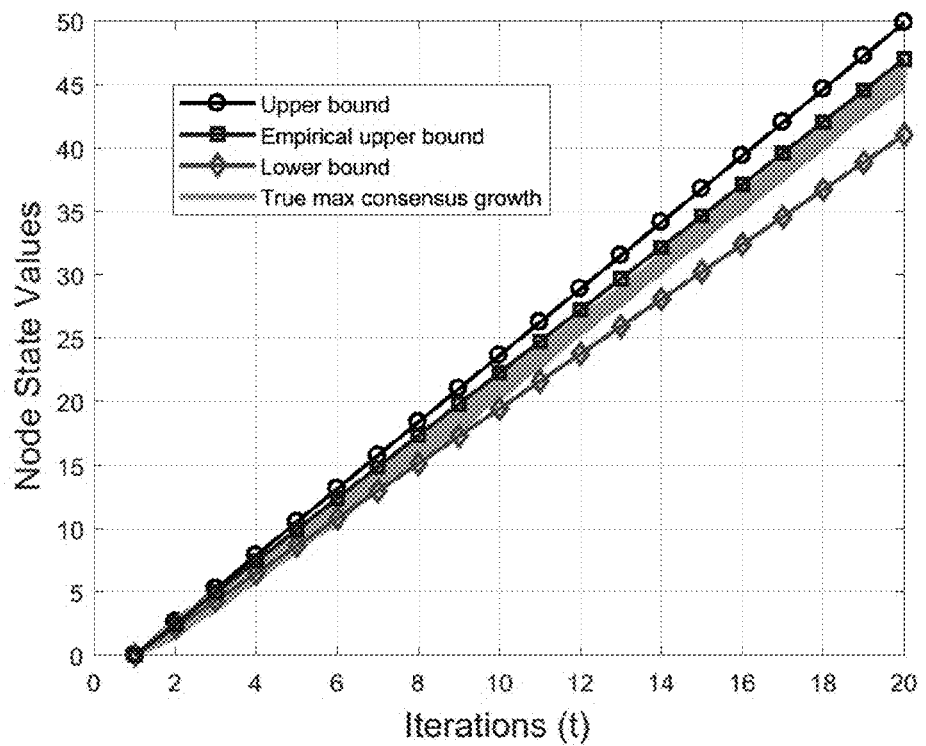
FIG. 4 is a graphical comparison of upper bound, lower bound and a max update for all nodes with $\mathcal{N}(0,1)$ additive noise for a fixed graph with N=75.

For fixed graphs, the upper bound given by equation (15), empirical upper bound, lower bound given by equation (26), and the Monte-Carlo estimate of max consensus growth is plotted for every node, labeled as "True max-consensus growth" in FIG. 4, and compared. It is observed in FIG. 4 that the empirical upper bound is much tighter than the original upper bound.

Figure 5:
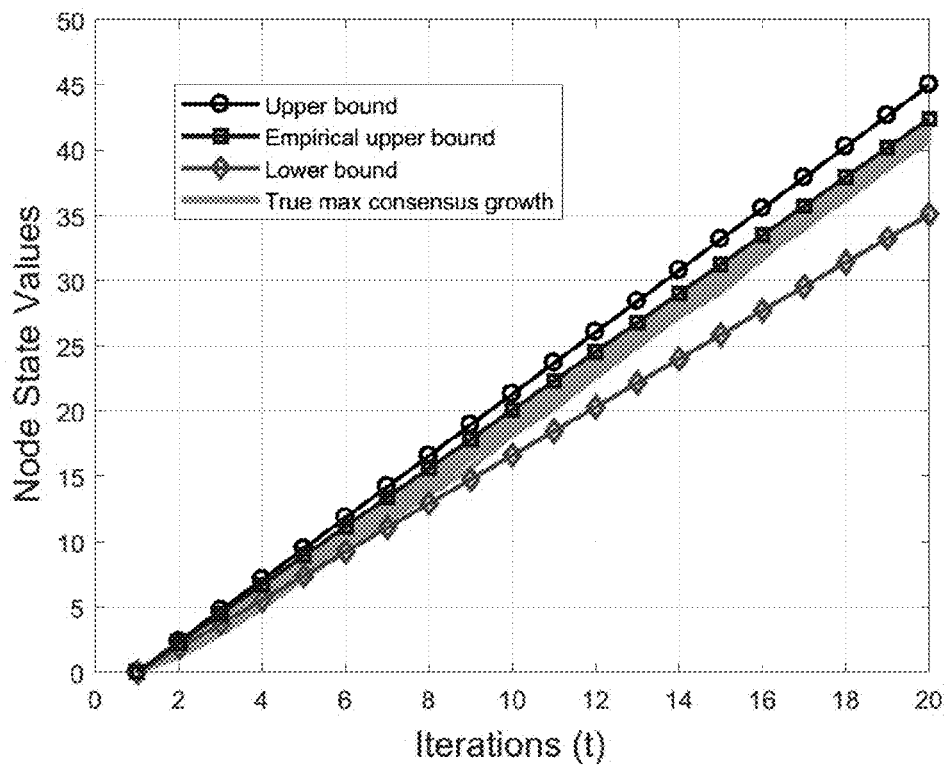
FIG. 5 is a set of random graphs with N=75 and edge deletion probability of p=0.5.

The same experiment was repeated on a random graph, which was obtained by randomly deleting each edge of the graph in FIG. 3 with probability p=0.5. The comparison of the upper bound, given by equation (28), empirical upper bound, lower bound given by equation (30), and the true Monte-Carlo estimate of the max consensus growth is shown in FIG. 5. Note that, not only the empirical upper bound is tight for time-varying graphs, but it is also generalizable for different graph topologies.

Figure 6:
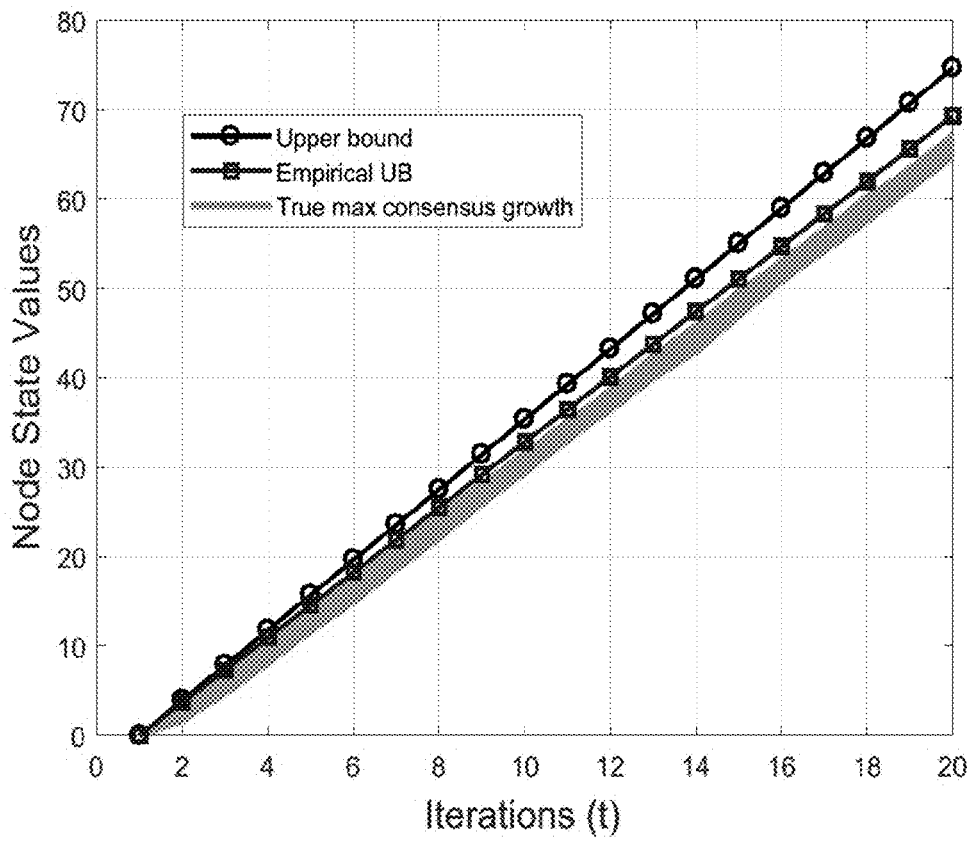
FIG. 6 is a first graphical comparison of upper bound, empirical upper bound and max consensus growth rate for the network.
Figure 7:
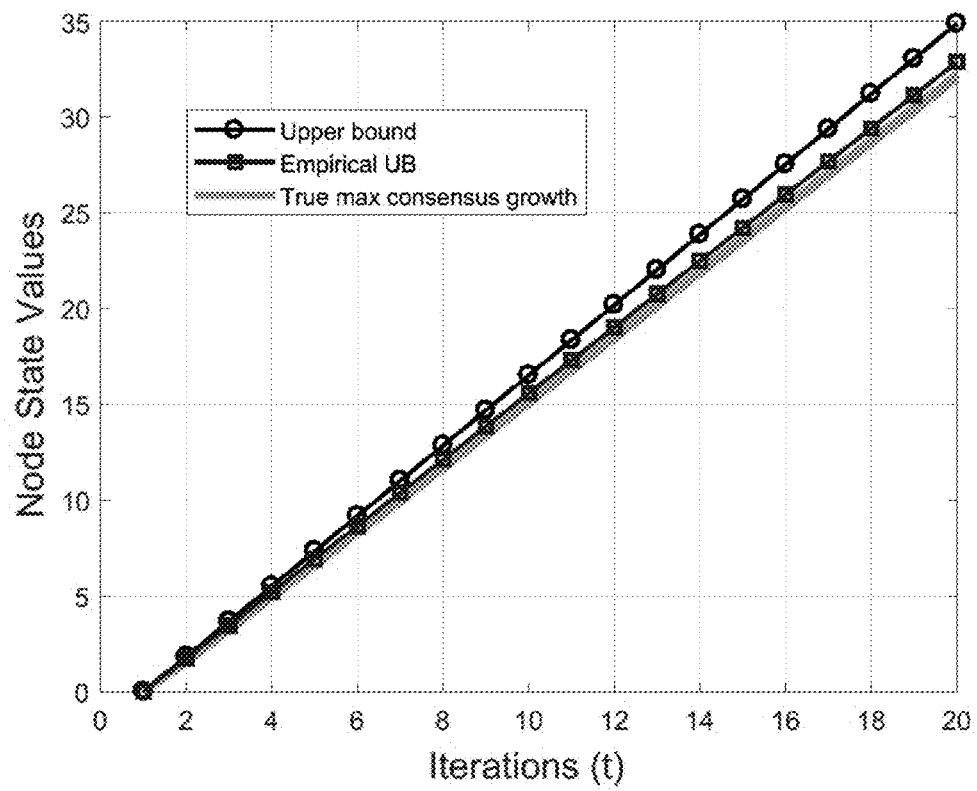
FIG. 7 is a second graphical comparison of Upper bound, empirical upper bound and max consensus growth rate for the network.

Next, simulations are run for non-Gaussian distributions such as Laplace and Uniform distributions to verify the tightness of upper bound. In FIGS. 6-7, the performance of upper bound and empirical upper bound is compared for network in FIG. 3 with N=75, where the noise on the links are sampled from Laplace and continuous uniform distributions, respectively. The parameters of Laplace distribution $L(\mu,b)$ were chosen as $\mu=0$ and $b=\sqrt{2}$, and uniform distribution $U(a,b)$ as $U(-\sqrt{3}, \sqrt{3})$, to ensure zero mean and unit variance. Results also show that the empirical upper bound holds good for general noise distributions. Since Laplace distribution is heavy-tailed compared to Gaussian and uniform, it has a larger growth rate.

Performance of the Algorithms

The performance of conventional max consensus algorithms and the proposed algorithm is compared, subjected to additive Gaussian noise $\mathcal{N}(0,1)$. In order to represent the actual sensor measurements, for both fixed and random graphs, a synthetic dataset with nodes initialized with values over (100, 200) is considered, where the true maximum of the initial state values is 200. The robust max consensus algorithm given in Algorithm 1 is run over these initial measurements on both the graphs. The results are Monte-Carlo averaged over 500 iterations.

Figure 8:
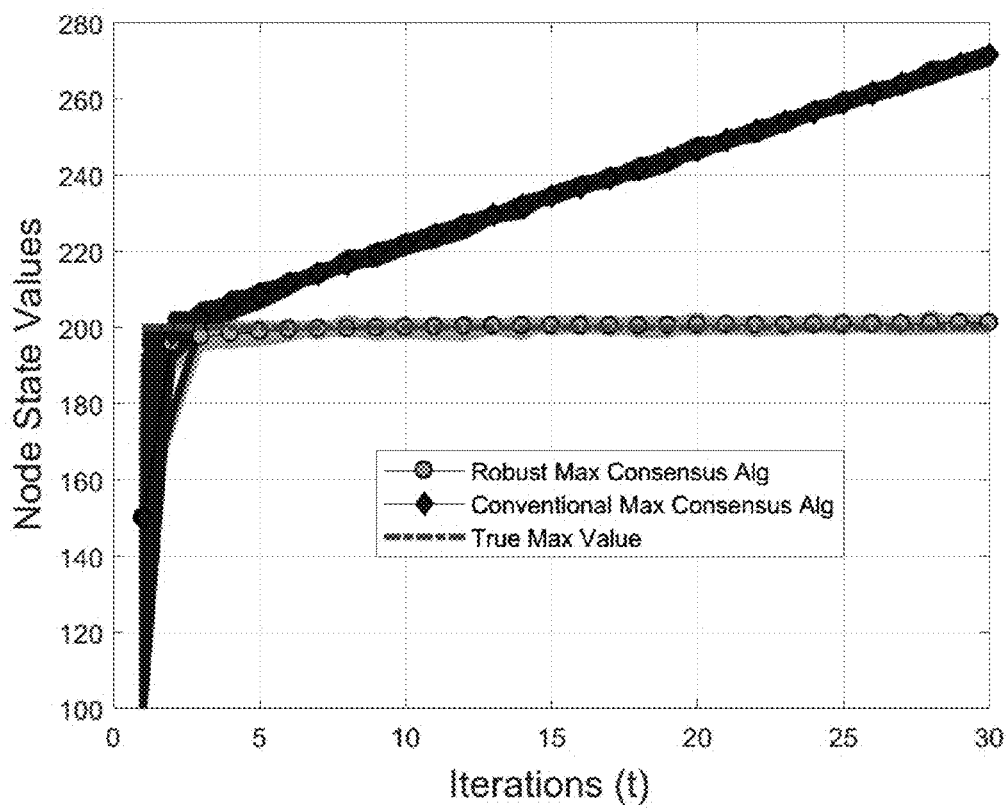
FIG. 8 is a graphical representation of the performance of an algorithm in the presence of additive noise from $\mathcal{N}(0,1)$ for fixed graphs.

For fixed graphs, performance of the robust max consensus algorithm and the existing max based consensus algorithm is shown in FIG. 8. It can be observed that the conventional max consensus algorithm diverges as t increases, whereas the algorithm does not suffer from increasing linear bias. Even in case of random graphs, the algorithm converges to the true maximum, whereas the conventional max consensus algorithm diverges as t increases, as shown in FIG. 7.

By comparing the dynamic range of growth rate of conventional max consensus algorithms in FIG. 8 and FIG.

9, it is observed that a) at t=30, state values over fixed graphs has mean and standard deviation of 270.39 and 0.6966 respectively, and b) at t=30, state values over random graphs with p=0.5 has mean and standard deviation of 261.09 and 0.9233, respectively. Thus, node state values grow slower for random graphs with 0<p<1, compared to fixed graphs (p=0) due to the reduced connectivity of the graph.

Comparison with Existing Works

Figure 9:
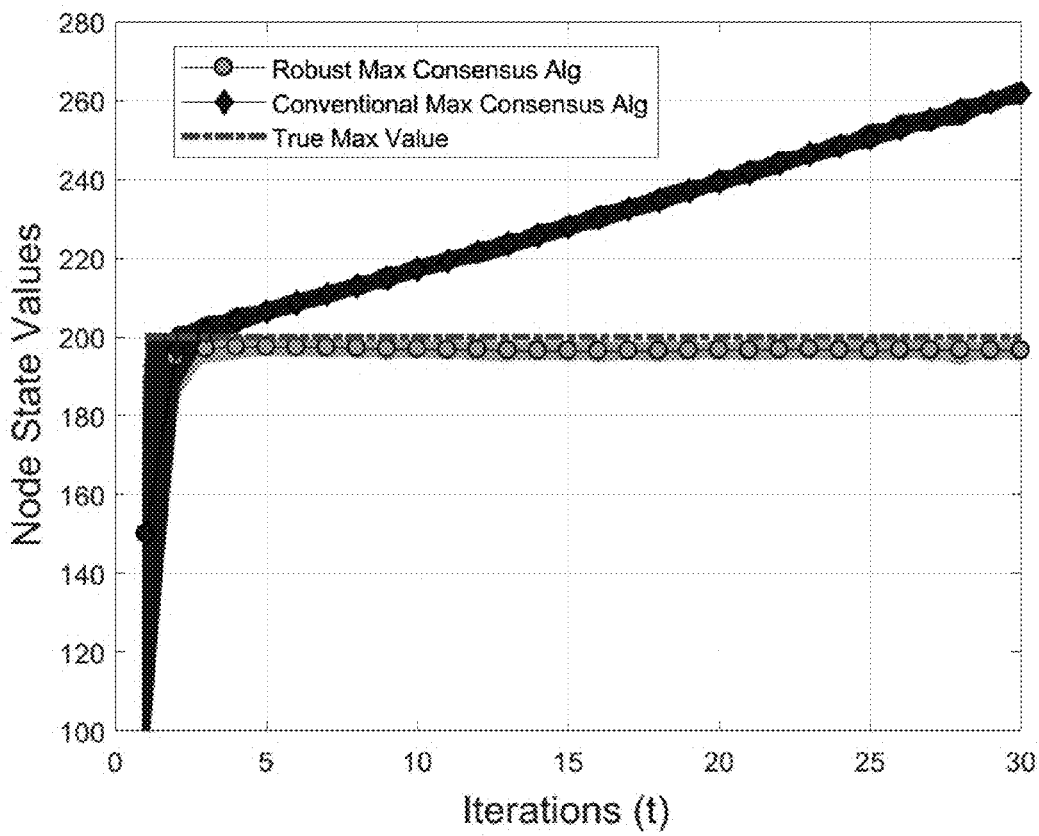
FIG. 9 is a graphical representation of the performance of the algorithm in the presence of additive noise from $\mathcal{N}(0,1)$ for random graphs with probability of edge deletion p=0.5.

The performance of the proposed algorithm was compared with the conventional max consensus algorithm in FIGS. 8-9 and clearly, conventional max consensus algorithm diverges in the presence of additive noise.

Figure 10:
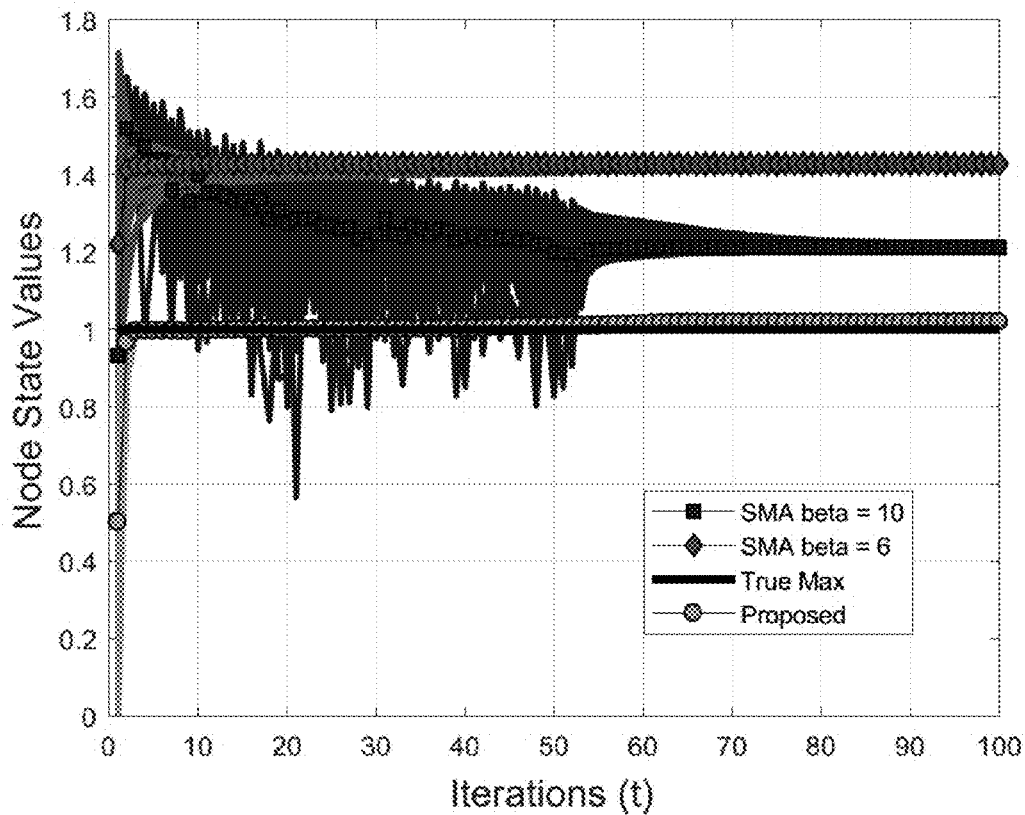
FIG. 10 is a graphical comparison of the algorithm and a soft-max based average consensus algorithm (SMA).

Additionally, the performance against the soft-max based average consensus algorithm (SMA) was compared, as shown in FIG. 10. The soft maximum of a vector $x=[x_1, \ldots, x_N]$ is denoted as:

$$s\max(x) = \frac{1}{\beta}\log\sum_{i=1}^{N} e^{\beta x_i},$$

where $\beta>0$ is a design parameter. The same network with N=75 is considered as in FIG. 3. Nodes were initialized linearly over (0, 1). The design parameter $\beta$ of the SMA algorithm was considered to be $\beta\{6,10\}$. The proposed algorithm and the SMA algorithm were applied in the presence of additive noise $\mathcal{N}(0,1)$, distributed over the edges.

The SMA algorithm with $\beta=6$ converges faster than with $\beta=10$, however, $\beta=6$ has greater estimation error than $\beta=10$. In comparison with SMA, the proposed algorithm performs better in terms of bias and variance of the estimate of true maximum value, and the number of iterations required for convergence.

Computing System

Figure 11:
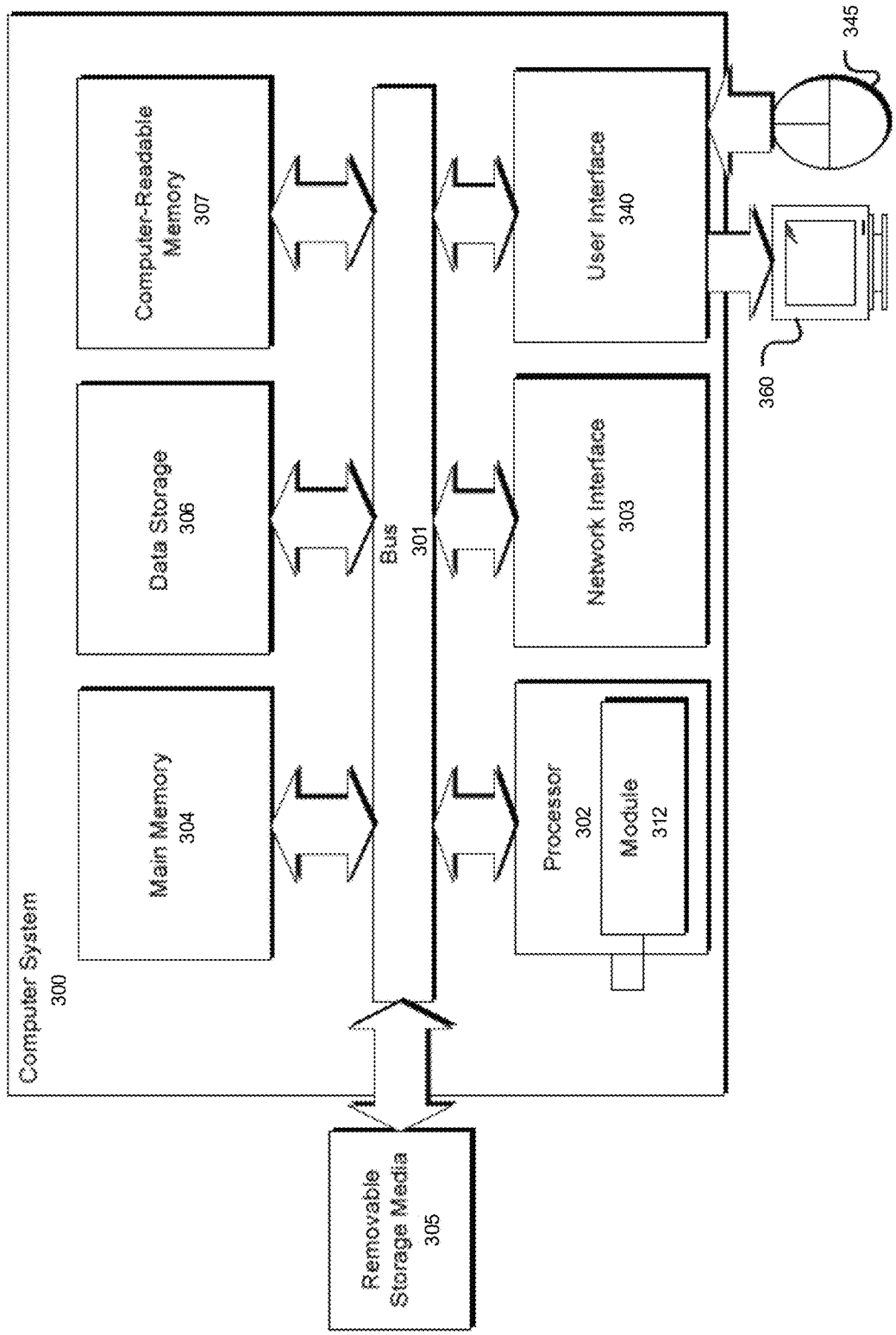
FIG. 11 is an exemplary computer system for effectuating the functionalities analyzing max consensus algorithms in the presence of additive noise. Corresponding reference characters indicate corresponding elements among the view of the drawings. The headings used in the figures do not limit the scope of the claims.

FIG. 11 illustrates an example of a suitable computing system 300 used to implement various aspects of the present system and methods for analysis of max consensus algorithms in the presence of additive noise. Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules 312. Such modules 312 are hardware-implemented, and thus include at least one tangible unit capable of performing certain operations and may be configured or arranged in a certain manner. For example, a hardware-implemented module 312 may comprise dedicated circuitry that is permanently configured (e.g., as a special-purpose processor, such as a field-programmable gate array (FPGA) or an application-specific integrated circuit (ASIC)) to perform certain operations. A hardware-implemented module 312 may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module 312 that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules 312 are temporarily configured (e.g., programmed), each of the hardware-implemented modules 312 need not be configured or instantiated at any one instance in time. For example, where the hardware-implemented modules 312 comprise a general-purpose processor configured using software, the general-purpose processor may be configured as respective different hardware-implemented modules 312 at different times. Software may accordingly configure a processor 302, for example, to constitute a particular hardware-implemented module at one instance of time and to constitute a different hardware-implemented module 312 at a different instance of time.

Hardware-implemented modules 312 may provide information to, and/or receive information from, other hardware-implemented modules 312. Accordingly, the described hardware-implemented modules 312 may be regarded as being communicatively coupled. Where multiple of such hardware-implemented modules 312 exist contemporaneously, communications may be achieved through signal transmission (e.g., over appropriate circuits and buses) that connect the hardware-implemented modules. In embodiments in which multiple hardware-implemented modules 312 are configured or instantiated at different times, communications between such hardware-implemented modules may be achieved, for example, through the storage and retrieval of information in memory structures to which the multiple hardware-implemented modules 312 have access. For example, one hardware-implemented module 312 may perform an operation, and may store the output of that operation in a memory device to which it is communicatively coupled. A further hardware-implemented module 312 may then, at a later time, access the memory device to retrieve and process the stored output. Hardware-implemented modules 312 may also initiate communications with input or output devices.

As illustrated, the computing system 300 may be a general purpose computing device, although it is contemplated that the computing system 300 may include other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the general purpose computing device may include various hardware components, such as a processor 302, a main memory 304 (e.g., a system memory), and a system bus 301 that couples various system components of the general purpose computing device to the processor 302. The system bus 301 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing system 300 may further include a variety of computer-readable media 307 that includes removable/non-removable media and volatile/nonvolatile media, but excludes transitory propagated signals. Computer-readable media 307 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the general purpose computing device. Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 304 includes computer storage media in the form of volatile/nonvolatile memory such as read only memory (ROM) and random access memory (RAM). A basic input/output system (BIOS), containing the basic routines that help to transfer information between elements within the general purpose computing device (e.g., during start-up) is typically stored in ROM. RAM typically contains data and/or program modules that are immediately accessible to and/or presently being operated on by processor 302. For example, in one embodiment, data storage 306 holds an operating system, application programs, and other program modules and program data.

Data storage 306 may also include other removable/non-removable, volatile/nonvolatile computer storage media. For example, data storage 306 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules and other data for the general purpose computing device 300.

A user may enter commands and information through a user interface 340 or other input devices 345 such as a tablet, electronic digitizer, a microphone, keyboard, and/or pointing device, commonly referred to as mouse, trackball or touch pad. Other input devices 345 may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices 345 are often connected to the processor 302 through a user interface 340 that is coupled to the system bus 301, but may be connected by other interface and bus structures, such as a parallel port, game port or a universal serial bus (USB). A monitor 360 or other type of display device is also connected to the system bus 301 via user interface 340, such as a video interface. The monitor 360 may also be integrated with a touch-screen panel or the like.

The general purpose computing device may operate in a networked or cloud-computing environment using logical connections of a network interface 303 to one or more remote devices, such as a remote computer. The remote computer may be a personal computer, a server, a router, a network PC, a peer device or other common network node, and typically includes many or all of the elements described above relative to the general purpose computing device. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the general purpose computing device may be connected to a public and/or private network through the network interface 303. In such embodiments, a modem or other means for establishing communications over the network is connected to the system bus 301 via the network interface 303 or other appropriate mechanism. A wireless networking component including an interface and antenna may be coupled through a suitable device such as an access point or peer computer to a network. In a networked environment, program modules depicted relative to the general purpose computing device, or portions thereof, may be stored in the remote memory storage device.

CONCLUSION

A practical approach for reliable estimation of maximum of the initial state values of nodes in a distributed network, in the presence of additive noise is proposed. Firstly, it was shown that the existence of a constant growth rate due to additive noise and then derived upper and lower bounds for the growth rate. It is argued that the growth rate is constant, and the upper bound is a function of spectral radius of the graph. By deriving a lower bound, it was proved that the growth rate is always a positive non-zero real value. Upper and lower bounds on the growth rate for random time-varying graphs were derived. An empirical upper bound is obtained by scaling the original bound, which is shown to be tighter and generalizable to different networks and noise settings. Finally, a fast max-based consensus algorithm was presented, which is robust to additive noise and showed that the variance of the growth rate estimator used in this algorithm decreases as $\mathcal{O}(t_{max}^{-1})$ using concentration inequalities. It was also shown that the variance of the estimator scales linearly with the diameter of the network. Simulation results corroborating the theory were also provided.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A distributed sensor network system, comprising:
a plurality of N sensor nodes, each sensor node i∈N assuming an assigned or measured state value $x_i(t)$;
a processor that estimates a final state value maximum of a plurality of state values $x_i(t)$ respectively produced by each sensor node i of the plurality of N sensor nodes of the distributed sensor network;
wherein to estimate the final state value maximum of the plurality of state values, the processor:
   determines a growth rate estimate $\lambda_i$ associated with each respective sensor node i of the plurality of N sensor nodes, wherein to determine the growth rate estimate $\lambda_i$ the processor:
      initializes the state value $x_i(t)$ of each sensor node i of the plurality of N sensor nodes to zero such that $x_i(0)=0$ for all i∈N; and
      updates the state value $x_i(t)$ of each sensor node i for $t_{max}$ iterations with a local maximum of the state values $x_i(t)$ and $x_j(t-1)$ of the sensor node i and one or more neighboring sensor nodes j;
   wherein the growth rate estimate A is described by $$\hat{\lambda}_i(t_{max}) = \frac{x_i(t_{max})}{t_{max}};$$

determines a true state value maximum of a plurality of true state value maxima for each respective sensor node i of the plurality of N sensor nodes at each iteration t of a plurality of $t_{max}$ iterations to generate a set of true state maxima, wherein to determine the true state value maximum the processor:
      measures an initial state value $x_i(0)$ by each sensor node i; and
      updates the state value $x_i(t)$ of each sensor node i for $t_{max}$ iterations with a local maximum of the state values $x_i(t)$ and $x_j(t-1)$ of the sensor node i and one or more neighboring sensor nodes j;
      wherein the growth rate estimate $\lambda_i$ is removed from each state value $x_i(t)$; and
   selecting a final state value maximum from the set of true state value maxima.

2. The distributed sensor network system of claim 1, wherein the one or more state values associated with the one or more neighboring sensor nodes of the plurality of sensor nodes include additive noise.

3. The distributed sensor network system of claim 1, wherein to determine a maximum of a state value $x_i(t)$ associated with the sensor node i and one or more state values $x_j(t)$ associated with one or more neighboring sensor nodes j of the plurality of N sensor nodes for an iteration t of the plurality of $t_{max}$ iterations, the processor:
   obtains a state value $x_i(t)$ measured by the sensor node i at iteration t;
   obtains one or more state values $x_j(t)$ associated with one or more neighboring sensor nodes j from a previous iteration t−1;
   compares the state value $x_i(t)$ measured by the sensor node i with each of the one or more state values $x_j(t)$ associated with one or more neighboring sensor nodes j; and
   selects the maximum from the state value $x_i(t)$ measured by the sensor node i and each of the one or more state values $x_j(t)$ associated with one or more neighboring sensor nodes j.

4. The distributed sensor network system of claim 1, wherein the growth rate estimate $\lambda_i$ is representative of a constant slope in max-based consensus measurement for a sensor node i of the plurality of N sensor nodes due to additive noise.

5. The distributed sensor network system of claim 1, wherein the measured initial state value $x_i(t)$ associated with a sensor node i of the plurality of N sensor nodes is a value measured by the sensor node prior to a first iteration t=1 of the plurality of $t_{max}$ iterations.

6. The distributed sensor network system of claim 1, wherein each connection between neighboring sensor nodes i and j contributes additive noise vi,j(t) to each state value $x_i(t)$ and $x_j(t)$ of the neighboring sensor nodes i and j, where i,j∈N.

7. The distributed sensor network system of claim 1, wherein to determine the growth rate estimate, the step of updating the state value $x_i(t)$ of each sensor node i for $t_{max}$ iterations with a local maximum of the state values $x_i(t)$ and $x_j(t-1)$ of the sensor node i and one or more neighboring sensor nodes j is such that:

$$x_i(t) = \max\left(x_i(t), \max_{j \in N_i}(x_j(t-1) + v_{ij}(t-1))\right).$$

8. The distributed sensor network system of claim 1, wherein to determine the true state value maximum, the step of updating the state value $x_i(t)$ of each sensor node i for $t_{max}$ iterations with a local maximum of the state values $x_i(t)$ and $x_j(t-1)$ of the sensor node i and one or more neighboring sensor nosed j is such that:

$$x_i(t) = \max\left(x_i(t), \max_{j \in N_i}(x_j(t-1) + v_{ij}(t-1))\right) - \hat{\lambda}_i(t_{max}).$$

9. The distributed sensor network system of claim 1, wherein the final state value maximum is a maximum of the set of true state value maxima.

10. A distributed sensor network system comprising:
a plurality of N sensor nodes, each sensor node i∈N assuming an assigned or measured state value $x_i(t)$;
a processor that estimates a final state value maximum of a plurality of state values $x_i(t)$ respectively produced by each sensor node i of the plurality of N sensor nodes of the distributed sensor network;
wherein to estimate the final state value maximum of the plurality of state values $x_i(t)$, the processor:
   determines a growth rate estimate $\lambda_i$ associated with each respective sensor node i of the plurality of N sensor nodes;

determines a true state value maximum of a plurality of true state value maxima for each respective sensor node i of the plurality of N sensor nodes at each iteration t of a plurality of $t_{max}$ iterations to generate a set of true state maxima by removing the growth rate estimate $\lambda_i$ associated with each respective sensor node i from the respective state values $x_i(t)$ of each sensor node $\lambda_i$ of the plurality of N sensor nodes; and selects a final state value maximum from the set of true state value maxima.

11. The system of claim 10, wherein to determine the growth rate estimate $\lambda_i$ the processor:

initializes the state value $x_i(t)$ of each sensor node i of the plurality of N sensor nodes to zero such that $x_i(0)=0$ for all $i \in N$; and updates the state value $x_i(t)$ of each sensor node i for $t_{max}$ iterations with a local maximum of the state values $x_i(t)$ and $x_j(t-1)$ of the sensor node i and one or more neighboring sensor nodes j;

wherein the growth rate estimate $\lambda_i$ is described by $$\hat{\lambda}_i(t_{max}) = \frac{x_i(t_{max})}{t_{max}}.$$

12. The system of claim 10, wherein to determine the true state value maximum the processor:

measures an initial state value $x_i(0)$ by each sensor node i; and updates the state value $x_i(t)$ of each sensor node i for $t_{max}$ iterations with a local maximum of the state values $x_i(t)$ and $x_j(t-1)$ of the sensor node i and one or more neighboring sensor nodes j.

13. The system of claim 12, wherein to update the state value $x_i(t)$ of each sensor node i for $t_{max}$ iterations with a local maximum of the state values $x_i(t)$ and $x_j(t-1)$ of the sensor node i and one or more neighboring sensor nodes, the processor:

determines an initial state value maximum $x_i(t)$ using the state value $x_i(0)$ associated with the sensor node i and one or more measured state values $x_j(t)$ associated with one or more neighboring sensor nodes of the plurality of N sensor nodes;

removes the growth rate estimate $\lambda_i$ associated with the sensor node i from the initial state value maximum $x_i(t)$ to obtain the true state value maximum for the sensor node i of the plurality of sensor nodes; and assigns the true state value maximum for each sensor node of the plurality of sensor nodes.

14. The system of claim 12, wherein the updated state value $x_i(t)$ is given by:

$$x_i(t) = \max\left(x_i(t), \max_{j \in N_i}(x_j(t-1) + v_{ij}(t-1))\right) - \hat{\lambda}_i(t_{max}).$$

15. The system of claim 6, wherein to determine the growth rate estimate $\lambda_i$ the processor:

determines an upper bound on a growth rate estimate $\lambda_i$ based on a spectral radius of the plurality of N sensor nodes.

16. A method for determining max-consensus of a plurality of nodes in a distributed network system, comprising:

providing a network including N sensor nodes, each sensor node i assuming an assigned or measured state value $x_i(t)$ and each connection between neighboring sensor nodes i and j assuming additive noise $v_{i,j}(t)$, where $i,j \in n$;

determining a growth rate estimate $\lambda_i$ associated with each respective sensor node i;

determining a true state value maximum for each respective sensor node i of the plurality of N sensor nodes for each iteration t of a plurality of $t_{max}$ iterations to generate a set of true state value maxima; and selecting a final state value maximum from the set of true state value maxima.

17. The method of claim 16, wherein the step of determining the growth rate estimate $\lambda_i$ associated with each respective sensor node i further comprises:

initializing the state value $x_i(t)$ of all sensor nodes to zero such that $x_i(0)=0$;

updating the state value $x_i(t)$ of each sensor node i with a local maximum for $t_{max}$ iterations such that $$x_i(t) = \max\left(x_i(t), \max_{j \in N_i}(x_j(t-1) + v_{ij}(t-1))\right);$$

and
determining the growth rate estimate $\lambda_i$ such that $$\hat{\lambda}_i(t_{max}) = \frac{x_i(t_{max})}{t_{max}}.$$

18. The method of claim 16, wherein the step of determining the true state value maximum further comprises:

measuring initial state value $x_i(0)$ by each sensor node i; and updating each sensor node i with a local maximum for $t_{max}$ iterations and subtracting growth rate estimate $\lambda_i$ such that $$x_i(t) = \max\left(x_i(t), \max_{j \in N_i}(x_j(t-1) + v_{ij}(t-1))\right) - \hat{\lambda}_i(t_{max}).$$

19. The method of claim 16, wherein each connection between neighboring sensor nodes i and j in the network contributes additive noise vi,j(t) to each state value $x_i(t)$ and $x_j(t)$ of the neighboring sensor nodes i and j, where $i,j \in N$.

20. The method of claim 16, wherein the step of determining the growth rate estimate $\lambda_i$ further comprises:

determining an upper bound on a growth rate estimate $\lambda_i$ based on a spectral radius of the plurality of N sensor nodes of the network.

* * * * *